United States Patent [19]
Sadanaka

[11] Patent Number: 5,400,305
[45] Date of Patent: Mar. 21, 1995

[54] AUDIO-VISUAL INFORMATION SIGNAL REPRODUCING APPARATUS THAT MUTES OUTPUT AUDIO UPON INPUT AUDIO SIGNAL INTERRUPTION

[75] Inventor: Nobuyuki Sadanaka, Chiba, Japan

[73] Assignee: Sony Corporation, Japan

[21] Appl. No.: 89,287

[22] Filed: Jul. 8, 1993

[30] Foreign Application Priority Data

Jul. 10, 1992 [JP] Japan .................. 4-207073

[51] Int. Cl.⁶ .................. H04B 1/20; H04N 5/76
[52] U.S. Cl. .................. 369/2; 369/58; 358/342; 358/341
[58] Field of Search .................. 369/2, 6, 50, 32, 54, 369/58, 59, 47, 48, 49, 53, 43, 44.28; 360/19.1, 62, 73.03, 14.1–14.3, 27; 358/143, 335, 341, 340, 342, 343, 142, 338; 381/94, 123

[56] References Cited
U.S. PATENT DOCUMENTS 4,723,295  2/1988  Kosaka et al. .................. 369/2 X

FOREIGN PATENT DOCUMENTS

0377471A1  7/1990  European Pat. Off. .

OTHER PUBLICATIONS

Patent Abstracts of Japan, vol. 15, No. 410 (P-1264), 18 Oct. 1991 & JP-A-31 65 373 (Sony Corp), 17 Jul. 1991.
Patent Abstracts of Japan, vol. 12, No. 46 (P-793) (3303), 30 Nov. 1988 & JP-A-63 177 375 (Alpine Electron Inc.), 21 Jul. 1988.

Primary Examiner—Ali Neyzari
Attorney, Agent, or Firm—Limbach & Limbach

[57] ABSTRACT

An audio visual information signal reproducing apparatus reproduces an audio visual information signal from a recording medium, the audio visual information signal being recorded on the recording medium and composed of a video signal and a digitized audio signal being time-division multiplexed in such a way that the frame interval of the video signal does not accord with the frame interval of the digitized audio signal. The apparatus sets an audio output mute flag of a control code contained in the digitized audio signal of the audio visual information signal being reproduced and shifts to a next operation mode when a normal play mode is interrupted.

7 Claims, 21 Drawing Sheets

Fig. 11A

| Fig.11 |
|---|
| Fig.11A \| Fig.11B |

| CONTROL CODE BIT NUMBER | 1 | 2 | 3 | 4 | 5 | 6 | 7·····11 | 12 |
|---|---|---|---|---|---|---|---|---|
| CONTENT OF CONTROL | MODE<br><br>0: A MODE<br>1: B MODE | TV AUDIO TYPE<br><br>00: STEREO<br>01: TWO SYSTEM OF MONAURAL<br>10: ONE SYSTEM OF MONAURAL<br>11: OTHER (*1) | | TV AUDIO TYPE<br><br>00: STEREO<br>01: TWO SYSTEM OF MONAURAL<br>10: ONE SYSTEM OF MONAURAL<br>11: SIGNAL OTHER THAN AUDIO | | NUMBER OF AUDIO CHANNEL<br><br>0: TWO CHANNELS<br>1: FOUR CHANNELS | BROADCASTING SYSTEM CONTROL EXTENDED BIT | VIDEO SCRAMBLE ID<br><br>0: DISABLED<br>1: ENABLED |

Fig. 11B

| 13 | 14 | 15 | 16 | 17 | 18......22 |
|---|---|---|---|---|---|
| SCRAMBL SYNCHRONI-ZATION | MASTER FRAME SYNCHRONI-ZATION | DATA TRANSMISSION CONTROL | AUDIO OUTPUT MUTE | ERROR CORRECTION MODE | BROADCASTING SYSTEM CONTROL EXTENDED BIT |
| 0: NOT COMMANDED | 0: OTHER THAN START FRAME OF MASTER FRAME | 0: NOT SUPPRESSED | 0: NOT SUPPRESSED | 0: STANDARD MODE | |
| 1: COMMANDED | 1: START FRAME OF MASTER FRAME | 1: SUPPRESSED | 1: SUPPRESSED | 1: ENHANCED MODE | |

Fig. 14
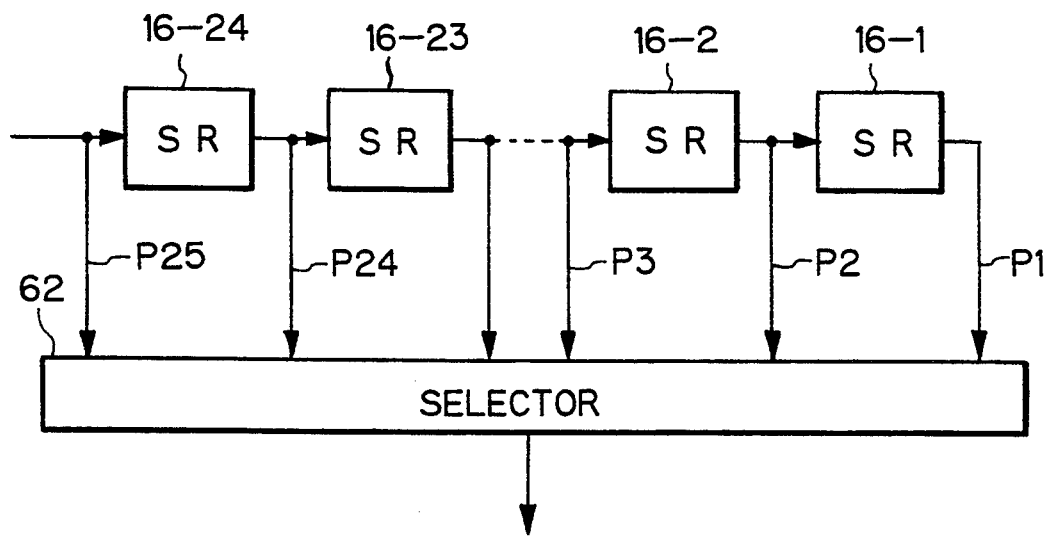
Fig. 16A
Fig. 16B
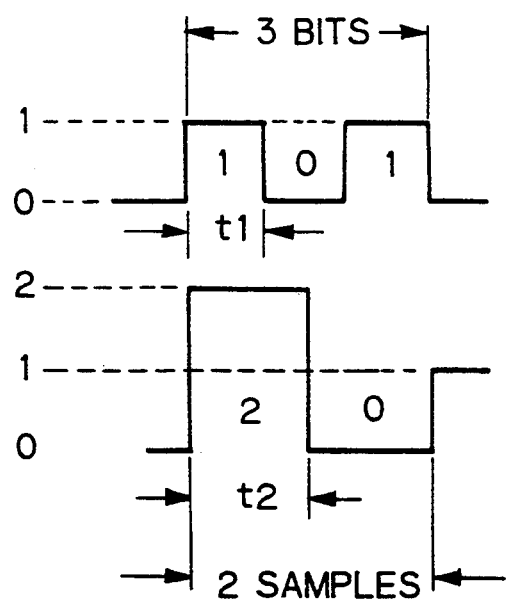

Fig. 15

| 3 BITS/BI-STATE | 2 SAMPLES/TRI-STATE |
|:---:|:---:|
| 0 0 0 | 0 0 |
| 0 0 1 | 0 1 |
| 0 1 0 | 1 2 |
| 0 1 1 | 0 2 |
| 1 0 0 | 1 0 |
| 1 0 1 | 2 0 |
| 1 1 0 | 2 2 |
| 1 1 1 | 2 1 |

Fig. 19A

- SCANNING LINE NOS. 3 TO 42 AND 565 TO 604

| HD | BLANK | DATA | BLANK |
|:---:|:---:|:---:|:---:|
| 11 | 3 | 464 (348 SAMPLES, 522 BITS) | 2 |

Fig. 19B

- SCANNING LINE NOS. 43 TO 46 AND 605 TO 608

| HD | C SIGNAL | BLANK | DATA | BLANK |
|:---:|:---:|:---:|:---:|:---:|
| 11 | 94 | 13 | 360 (270 SAMPLES, 405 BITS) | 2 |

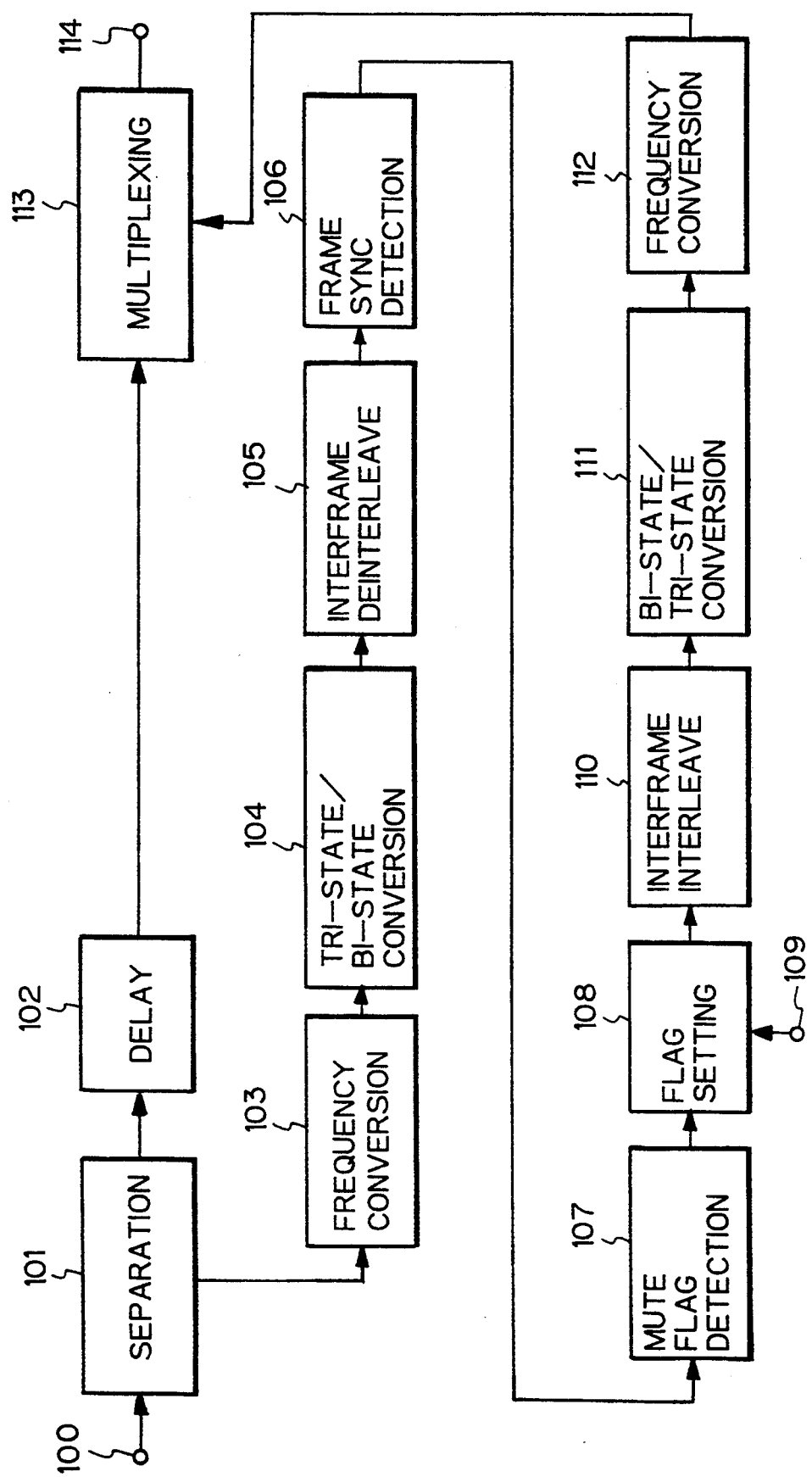

AUDIO-VISUAL INFORMATION SIGNAL REPRODUCING APPARATUS THAT MUTES OUTPUT AUDIO UPON INPUT AUDIO SIGNAL INTERRUPTION

BACKGROUND OF THE INVENTION

1. Field of the Invention

The present invention relates to an audio visual information signal reproducing apparatus for reproducing an audio visual information signal of the MUSE (Multiple Sub-Nyquist Sampling Encode) system, which is a transmission system for high definition television in Japan, and particularly relates to a video disc player of the MUSE system for preventing a noise from being generated when audio reproduction is abruptly interrupted.

2. Description of the Prior Art

Video disc players which reproduce video signals of the MUSE system from optical discs are being developed. In the MUSE system, a wide band high definition TV signal is compressed by approximately ¼ times and then transmitted. Moreover, in the MUSE system, an audio signal is digitized, compressed, and encoded. The resultant signal is time-division multiplexed in a vertical blanking interval of a video signal. Thus, high quality sound suitable for the high quality video can be reproduced.

FIG. 1 is a block diagram showing the construction of a conventional video disc reproducing system. In FIG. 1, a reference numeral 501 denotes a video disc player of the MUSE system for reproducing a video disc on which a MUSE signal is recorded. This video disc player 501 is hereinafter referred to as the MUSE video disc player. The MUSE video disc player 501 reproduces a MUSE signal from a MUSE video disc. The reproduced MUSE signal is supplied to a MUSE decoder 502. The MUSE decoder 502 decodes the MUSE signal into a video signal and an audio signal. The video signal reproduced from the MUSE decoder 502 is supplied to a display 503 with an aspect ratio of 16 to 9. Thus, a high definition TV picture is reproduced on the display 503. On the other hand, the reproduced audio signal is supplied to an audio amplifier 504. The audio amplifier 504 amplifies the reproduced audio signal and sends the signal to a speaker 505. The speaker 505 outputs the reproduced audio signal.

In the conventional MUSE video disc player system, when the reproduction is completed, when the power is turned off, or when a special play mode is performed, the speaker generates an uncomfortable noise. This is because in the MUSE system compression and encoding based on DPCM (Differential Pulse Code Modulation) are performed. Thus, when the reproduction is abruptly interrupted, audio data becomes in error.

In other words, even a small error of a digital audio signal adversely affects a decoded analog output, resulting in a large noise. Thus, generally, a digital audio signal is encoded with an error correction code having high error correction capability. A MUSE audio signal is encoded with an error correction code at intervals of an audio frame which is equivalent to data for 1 msec. Thus, even if an error takes place, when it is within the correction capability, it is corrected. However, if a MUSE signal which is supplied to the decoder abruptly stops, an error which exceeds the error correction capability takes place. Thus, when the reproduction is completed, an uncomfortable noise takes place.

To solve this problem, as shown in FIG. 1, a control line 506 is disposed between the MUSE video disc player 501 and the MUSE decoder 502. When the reproduction of the MUSE video disc player 501 is stopped, the MUSE video disc player 501 sends a mute command to the MUSE decoder 502 so as to mute the audio reproduction.

However, when the control line 506 is provided, the number of control lines increases. Moreover, connecting the MUSE video disc player 501 and the MUSE decoder 502 with the control line 506 is non-standard. Thus, the MUSE video disc player 501 may not be used with MUSE decoders requiring the control line 506.

In addition, as shown in FIG. 2, another apparatus has been proposed where a switch 507 is disposed in the MUSE video disc player 501 so as to supply the audio output of the MUSE decoder 502 to the audio amplifier 504 through the switch 507. In the normal reproduction state, the switch 507 is turned on. Then, just before the reproduction of the MUSE video disc player 501 is interrupted, the switch 507 is turned off.

As shown in FIG. 2, when the switch 507 is provided in the MUSE video disc player 501, it is not necessary to provide the control line between the MUSE video disc player 501 and the MUSE decoder 502.

However, in this case, it is necessary to provide an audio signal line 508 between the MUSE decoder 502 and the MUSE video disc player 501, which is again non-standard.

OBJECTS AND SUMMARY OF THE INVENTION

Therefore, an object of the present invention is to provide an audio visual information signal reproducing apparatus capable of preventing a uncomfortable noise generated, for example, when the reproduction is interrupted without necessity of a special line disposed between a MUSE video disc player and a MUSE decoder.

Broadly speaking, there is provided an audio visual information signal reproducing apparatus for reproducing an audio visual information signal from a recording medium, the audio visual information signal recorded on the recording medium and composed of a video signal and a digitized audio signal time-division multiplexed in such a way that the frame interval of the video signal does not accord with the frame interval of the digitized audio signal, wherein the apparatus sets an audio output mute flag of a control code contained in the digitized audio signal of the audio visual information signal being reproduced, and shifts to a new operation mode when a normal play mode is interrupted.

According to a first aspect of the invention, the audio visual information signal reproducing apparatus is adapted to set the audio output mute flag on a real time basis by extracting the digitized audio signal from the audio visual signal being reproduced, generating an audio output mute flag when the extracted digitized audio signal indicates an interruption of a normal play mode, and replacing an audio output mute flag of a control code contained in the digitized audio signal of the audio visual signal being reproduced.

According to a second aspect of the invention, the audio visual information signal reproducing apparatus is adapted to convert the digitized audio signal contained in the audio visual information signal being reproduced into a tri-state audio data signal by a frequency conversion, detect a skew sync signal according to the tri-state audio data signal, create a timing signal according to the skew sync signal being detected, and set the audio output mute flag according to the timing signal.

According to a third aspect of the invention, the audio visual information signal reproducing apparatus is adapted to convert the digitized audio signal of the audio visual information signal being reproduced into a tri-state audio data signal by a frequency conversion, convert the tri-state audio data signal into a bi-state data signal, detect a skew sync signal, create a timing signal according to the skew sync signal being detected, and set the audio output mute flag according to the timing signal.

According to a fourth aspect of the invention, the audio visual information signal reproducing apparatus is adapted to separate the digitized audio signal and the video signal from the audio visual information signal being reproduced, set the audio output mute flag of the separated digitized audio signal, and multiplex the separated digitized audio signal with the video signal which has passed through a delay circuit, and output an audio visual information signal.

According to a fifth aspect of the invention, the audio visual information signal reproducing apparatus is adapted to convert the digitized separated audio signal into a tri-state audio data signal by a frequency conversion, detect a skew sync signal from the state of the tri-state audio data signal so as to detect the position of the audio output mute flag, set the audio output mute flag, convert the frequency-converted tri-state digitized audio data into the digitized audio signal with the original frequency by a frequency conversion, multiplex the original digitized audio signal with the original frequency with a video signal which has passed through the delay circuit, and output the resultant signal.

According to a seventh aspect of the invention, the audio visual information signal reproducing apparatus is adapted to convert the separated digitized audio signal into a tri-state audio data signal by a frequency conversion, convert the tri-state audio data signal into a bi-state data signal, detect a skew sync signal from the bi-state data signal so as to detect the position of the audio output mute flag, set the audio output mute flag, convert the bi-state data signal into a tri-state audio data signal, restore the converted tri-state digitized audio data signal into the digitized audio signal with the original frequency by a frequency conversion, multiplex the digitized audio signal with the original frequency with a video signal which has passed through the delay circuit, and output the resultant signal.

According to an eighth aspect of the invention, the audio visual information signal reproducing apparatus is adapted to convert the separated digitized audio signal into a tri-state audio data signal by a frequency conversion, convert the tri-state audio data signal into a bi-state data signal, deinterleave the bi-state data signal, detect a frame sync signal, detect the position of the audio output mute flag according to the frame sync signal being detected, set the audio output mute flag, interframe interleave the bi-state data signal with the audio output mute flag set, convert the resultant bi-state data signal into a tri-state audio data signal, restore the converted tri-state digitized audio data signal into the digitized audio signal with the original frequency by a frequency conversion, multiplex the digitized audio signal with the original frequency with a video signal which has passed through the delay circuit, and output the resultant signal.

When a MUSE audio signal becomes in error, for example, when the reproduction is completed, when the power is turned off, or when a special play mode is performed, an audio output mute bit is turned on. Thus, an uncomfortable noise generated, for example, when the reproduction is completed, when the power is turned off, or when a special play mode is performed can be prevented. In addition, since the sound is muted with the audio output mute bit turned on, the apparatus can be used with any MUSE decoder.

The position of the audio output mute bit is detected from a MUSE signal securely and by a simple circuit construction.

The above, and other, objects, features and advantage of the present invention will become readily apparent from the following detailed description thereof which is to be read in connection with the accompanying drawings.

BRIEF DESCRIPTION OF THE DRAWINGS

FIG. 11 is a table for explaining the MUSE audio transmission system;

FIG. 14 is a block diagram for explaining the MUSE audio transmission system;

FIG. 15 is a table for explaining the MUSE audio transmission system;

FIGS. 16A and 16B are waveform diagrams for explaining the MUSE audio transmission system;

FIGS. 19A and 19B are schematic diagrams for explaining the MUSE audio transmission system;

FIG. 20 is a block diagram showing the construction of a first example of a mute flag preset control circuit to which the present invention has been applied;

DETAILED DESCRIPTION OF THE PREFERRED EMBODIMENTS

Figure 1:
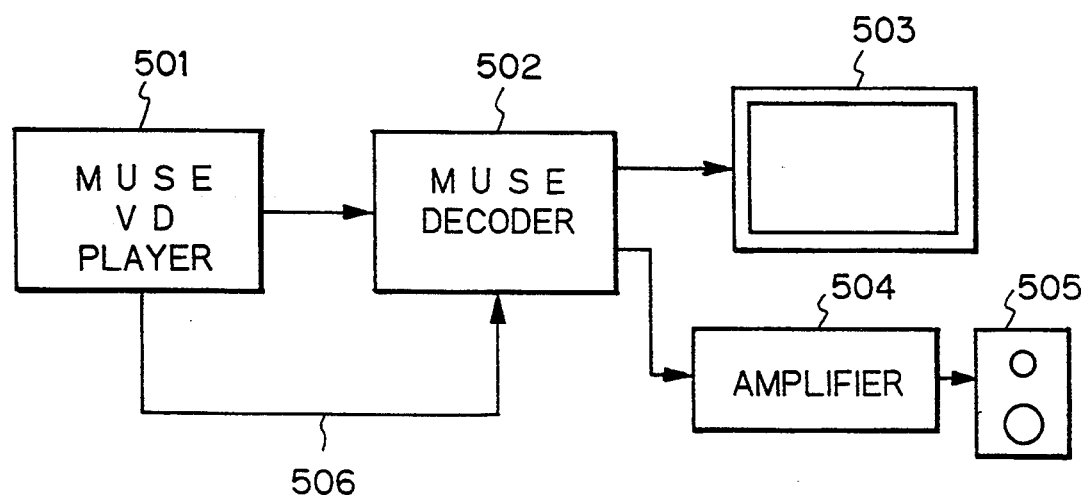
FIG. 1 is a block diagram of a conventional MUSE system.
Figure 2:
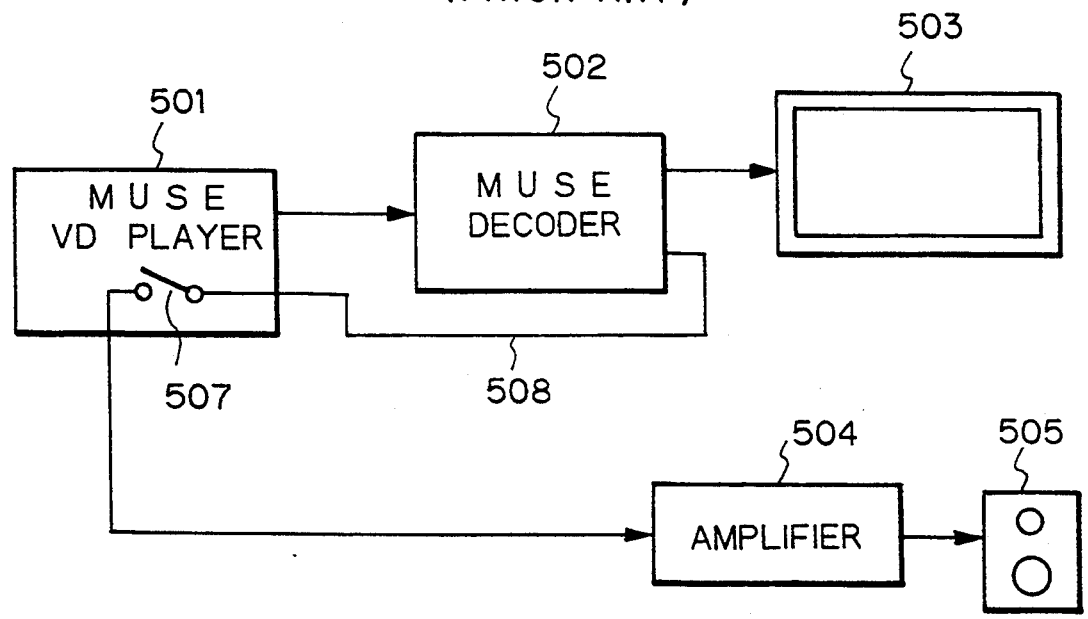
FIG. 2 is a block diagram of another conventional MUSE system.
Figure 3:
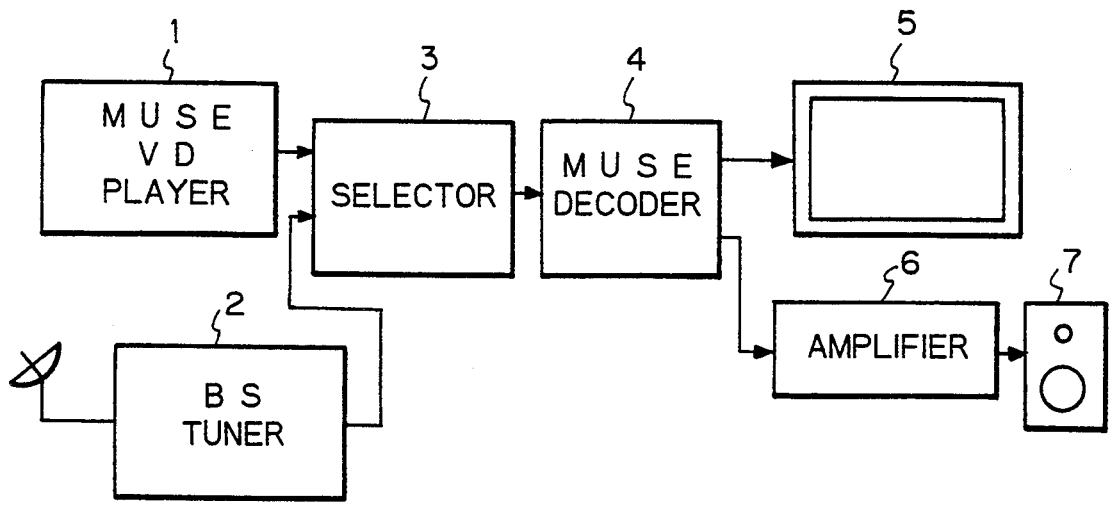
FIG. 3 is a block diagram of a MUSE system in accordance with the present invention.

An embodiment of the present invention will be described in the following order with reference to the accompanying drawings.

a. An example of MUSE reproducing system
   b. MUSE video disc player
   c. MUSE audio recording system
   d. An example of MUSE decoder
   e. Relation between audio frame and audio data placed in vertical blanking interval
   f. First example of mute flag preset control circuit
   g. Second example of mute flag preset control circuit
   h. Third example of mute flag preset control circuit
   i. Fourth example of mute flag preset control circuit
   j. Practical construction of tri-state skew sync detection circuit
   k. Fifth example of mute flag preset control circuit
   l. Sixth example of mute flag preset control circuit
   a. An example of MUSE reproducing system FIG. 3 is a block diagram of a MUSE reproducing system using a video disc player in accordance with the present invention. A video disc player 1 reproduces a MUSE video signal from an optical disc on which the MUSE video signal has been recorded. A Broadcast Satellite (BS) tuner 2 can receive a MUSE broadcasting program from a broadcast satellite.

A reproduced signal reproduced from the MUSE video disc player 1 is supplied to a selector 3. A reproduced signal reproduced from the BS tuner 2 is also supplied to the selector 3. The selector 3 selects either the reproduced MUSE signal reproduced by the MUSE video disc player 1 or the signal reproduced by the BS tuner 2. An output of the selector 3 is supplied to a MUSE decoder 4.

The MUSE decoder 4 decodes the selected MUSE signal into a video signal and an audio signal. The video signal decoded by the MUSE decoder 4 is supplied to a display 5 with an aspect ratio of 16 to 9. A picture according to the MUSE signal received from the MUSE video disc player 1 or the BS tuner 2 is reproduced on the display 5. The audio signal received from the MUSE decoder 4 is supplied to an amplifier 6. The amplifier 6 amplifies audio the audio signal and supplies the amplified signal to a speaker 7. The speaker 7 reproduces the audio signal according to the amplified audio signal.

In the MUSE system, as will be described later, the audio signal is compressed by a DPCM-based compression system and time-division multiplexed in a vertical blanking interval of the video signal. In the MUSE system, when the audio reproduction is stopped, the audio data becomes in error, resulting in occurrence of an uncomfortable noise.

Thus, when such an error occurs an audio output mute bit contained in a control code of an audio frame is turned on. In this manner, after the audio output of the MUSE decoder 4 is muted by turning on the audio output mute bit, the reproduction is stopped. Thus, occurrence of an uncomfortable noise can be prevented. In this construction, since it is not necessary to connect the MUSE video disc player 1 and the MUSE decoder 4 with a special line, the MUSE video disc player 1 may be used with any MUSE decoder. A technique for locating the position of the audio output mute bit in the audio frame and for turning on the audio output mute bit will be described later.

b. MUSE video disc player

Figure 4:
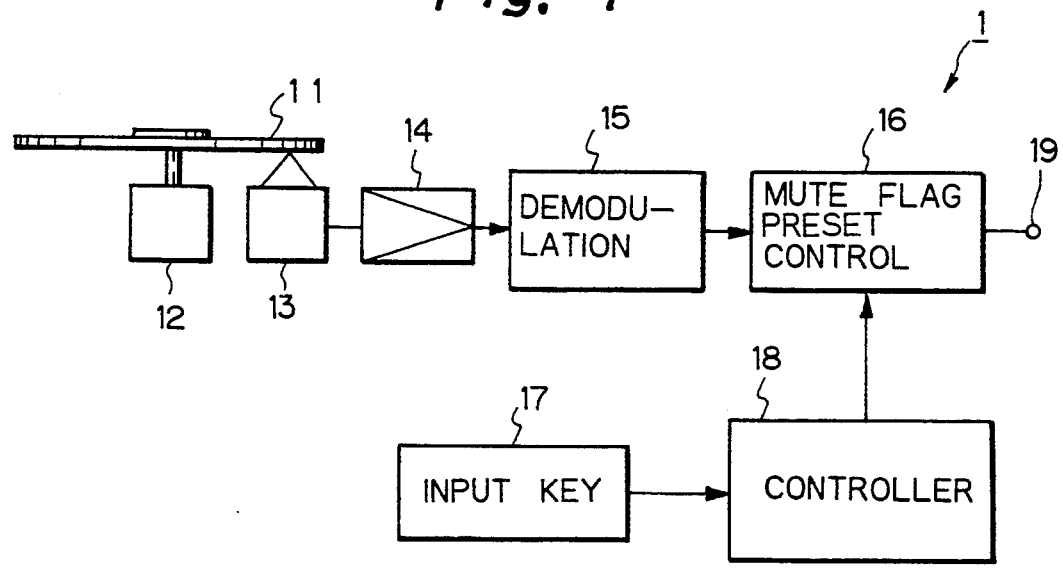
FIG. 4 is a block diagram of a MUSE video disc player in accordance with the present invention.

FIG. 4 shows the construction of the MUSE video disc player 1. In the video disc player 1, when an error takes place due to a stop of audio reproduction the audio reproduction is muted by turning on the audio output mute bit contained in a control code of an audio frame.

On an optical disc 11, a MUSE signal has been FM modulated and recorded. The optical disc 11 is rotated by a spindle motor 12. The signal is reproduced from the optical disc 11 by an optical pickup 13. The reproduced° signal is supplied to a demodulation circuit 15 through an RF amplifier 14. The demodulation circuit 15 FM demodulates the reproduced signal received from the optical disc 11. An output of the demodulation circuit 15 is supplied to a mute flag preset control circuit 16.

The mute flag preset control circuit 16 turns on the audio output mute bit contained in a control code of an audio frame when an error occurs in the audio out signal. The construction of the mute flag preset control circuit 16 will be described later.

During normal play the demodulation circuit 15 generates an output signal at an output terminal 19. By an input key 17, when a power off operation, a reproduction stop operation, a special play mode, or the like is commanded, a controller 18 activates the mute flag preset control circuit 16. Thus, just before one of such operations is performed, the audio output mute bit is turned on.

Figure 5:
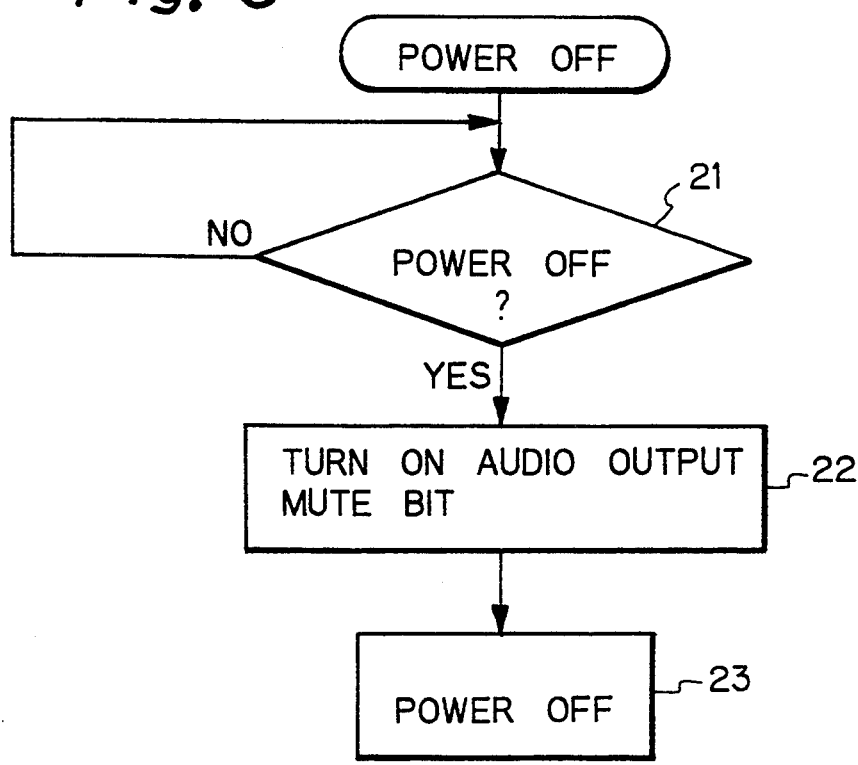
FIG. 5 is a flow chart for explaining an embodiment of the present invention.

FIGS. 5 to 8 are flow charts showing controls of such commanded operations. FIG. 5 is a flow chart showing the control of the power off operation. When the power off operation is commanded by the input key 17 (at step 21), the audio output mute bit is turned on (at step 22). Thereafter, the power of the video disc player 1 is actually turned off (at step 23).

When the power off operation is performed, audio data is abruptly stopped. Thus, a noise may take place. However, when the audio output mute bit is turned on just before the power is turned off, the reproduced sound is muted in the MUSE decoder 4 just before the power is turned off, thereby preventing a noise from taking place.

Figure 6:
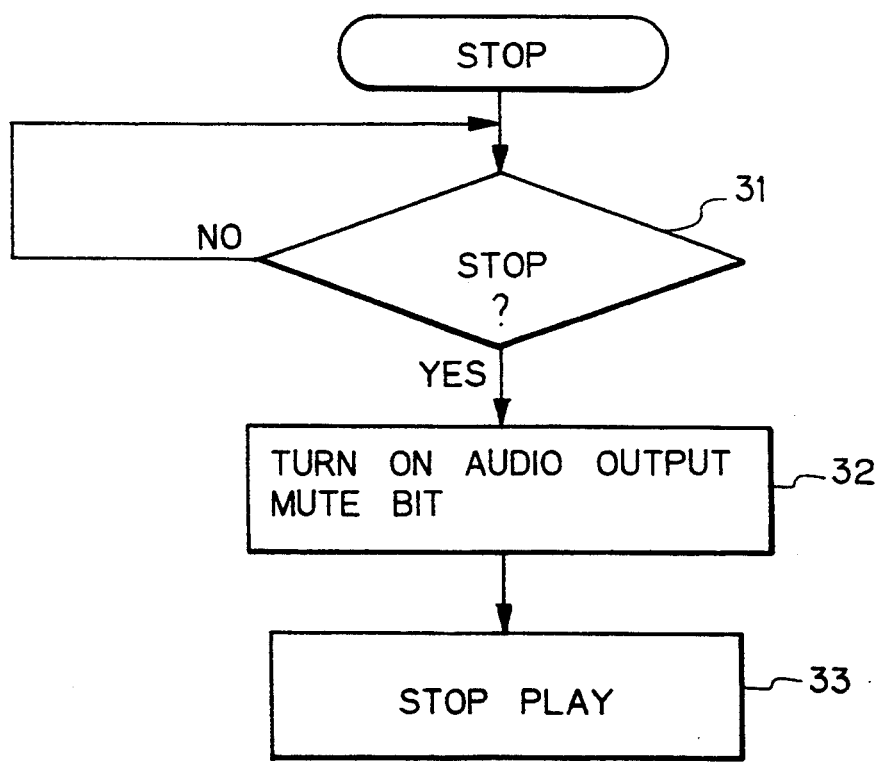
FIG. 6 is a flow chart for explaining the embodiment of the present invention.

FIG. 6 is a flow chart showing the control of the reproduction stop operation. When the stop operation is commanded by the input key 17 (at step 31), the audio output mute bit is turned on (at step 32). Thereafter, the reproduction is stopped (at step 33).

When the reproduction is stopped, since audio data is abruptly stopped, a noise may take place. However, when the audio output mute bit is turned on just before the reproduction is stopped, the reproduced sound is muted in the MUSE decoder 4, thereby preventing a noise from taking place.

Figure 7:
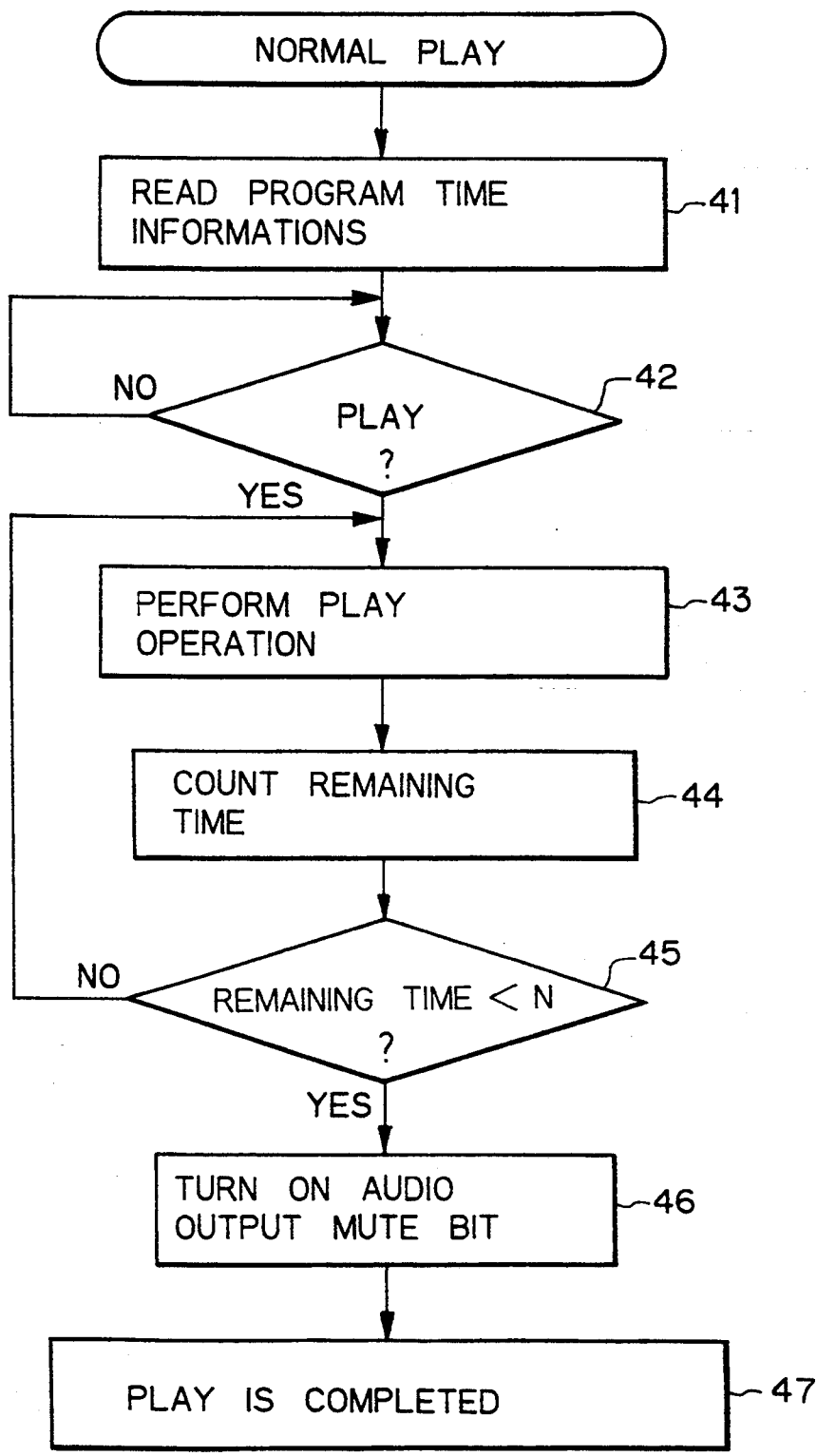
FIG. 7 is a flow chart for explaining the embodiment of the present invention.

FIG. 7 is a flow chart showing the process upon completion of one program in normal play mode. Program time information is read from TOC (Table Of Contents) (at step 41). When a play operation is commanded by the input key 17 (at step 42), the reproduction of the program is started (at step 43). At step 41, based on the time information being read, the remaining time of the program is counted (at step 44). It is determined whether or not the remaining reproduction time becomes a predetermined value N or less. The reproduction is continued until the remaining reproduction time becomes N or less. When the remaining reproduction time becomes N or less, the audio output mute bit is turned on (at step 46) and the reproduction of the program is completed (at step 47).

When the reproduction of a particular program is completed in the normal play mode, a noise may take place since audio data is abruptly stopped. However, when the reproduction time information of the program has been obtained from the TOC and the audio output mute bit is turned on just before the program is completed, reproduced sound is muted in the MUSE decoder 4 just before the reproduction of the program is completed, thereby preventing a noise from taking place.

Figure 8:
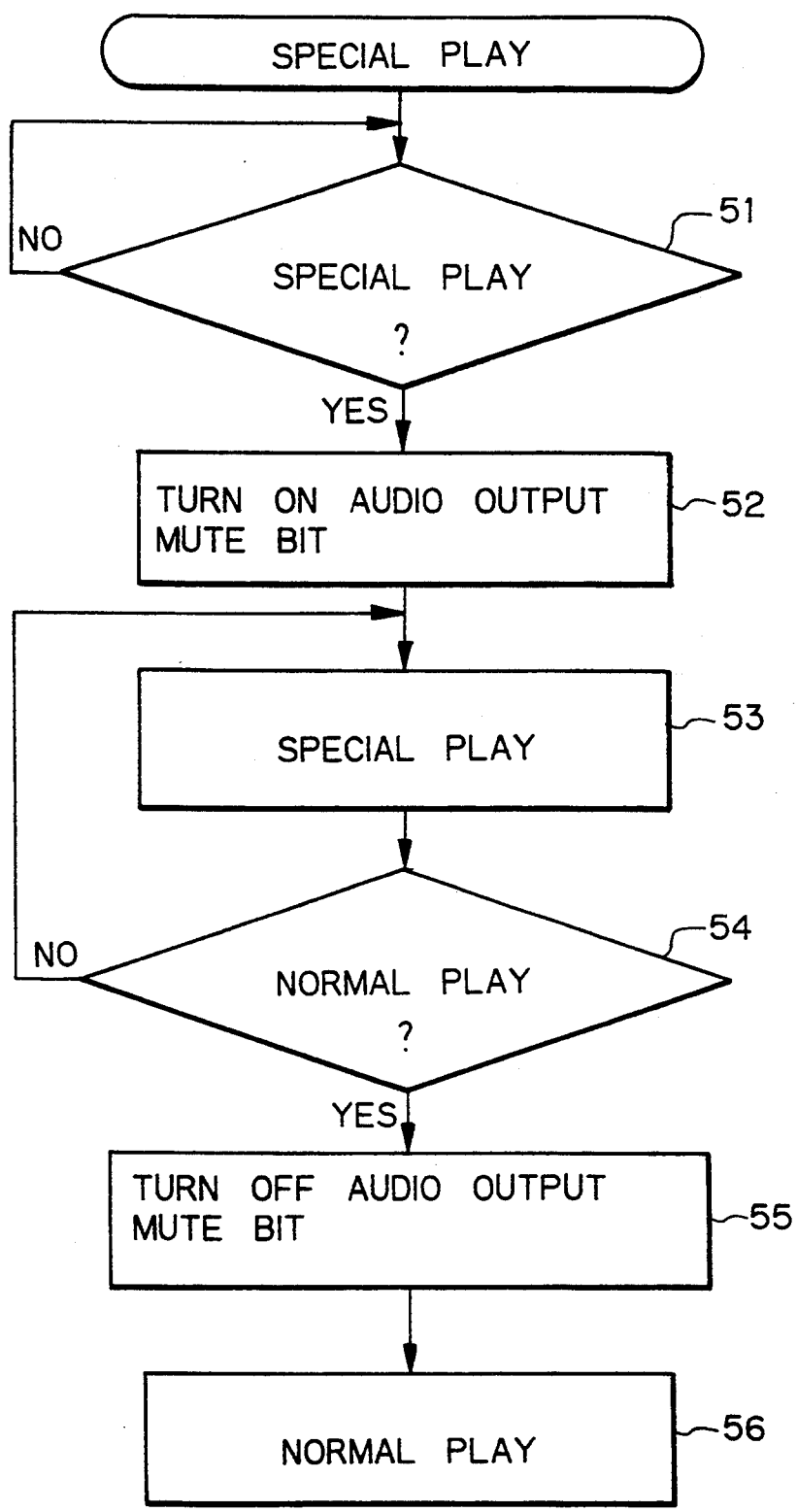
FIG. 8 is a flow chart for explaining the embodiment of the present invention.

FIG. 8 is a flow chart showing the process of the special play mode. When the special play mode is commanded by the input key 17 (at step 51), the audio output mute bit is turned on (at step 52). Thus, the special play mode is started (at step 53). Depending on the operation of the input key 17, it is determined whether or not the special play mode is switched to the normal play mode (at step 54). Until the special play mode is switched to the normal play mode, the special play mode is continued. When the special play mode is released to the normal play mode, the audio output mute bit is turned off (at step 55) and the special play mode is switched to the normal play mode.

While the special play mode is being performed, the audio output is stopped. Just before the special play mode is performed, a noise may take place. When the audio output mute bit is turned on just before the special play mode is performed, the reproduced sound is muted in the MUSE decoder 4 upon completion of the reproduction of the program, thereby preventing a noise from taking place.

c. MUSE audio recording system

In the mute flag preset control circuit 16 to which the present invention has been applied, when an audio signal becomes an error, the MUSE signal causes the audio output mute flag to be turned on so as to prevent a noise from taking place. Before explaining the theory of the mute flag preset control circuit 16, MUSE audio recording system will be described.

In MUSE audio transmission system, two types of audio modes, A mode and B mode are provided. The A mode is a surround reproduction mode, whereas the B mode is a high quality stereo reproduction mode.

In the A mode, there are four channels of input audio signals. The four channels of audio signals are digitized with a 32 kHz sampling frequency and 15 quantizing bits. The bandwidth of the audio signals is 15 kHz. Each digital audio signal is compression coded into 8 bit data by an audio compression encoder.

In the B mode, there are two channels of input audio signals. The two channels of audio signals are digitized with a 48 kHz sampling frequency and 16 quantizing bits. The bandwidth of the audio signals is 20 kHz. The digital audio signal is compression coded into 11 bit data by the audio compression encoder.

The audio band compression is performed according to a system based on differential PCM (Pulse Code Modulation) technique (semi-instantaneous compression). By such an audio compression technique, audio data is compressed to approximately 65 percent of the original data.

Figure 9:
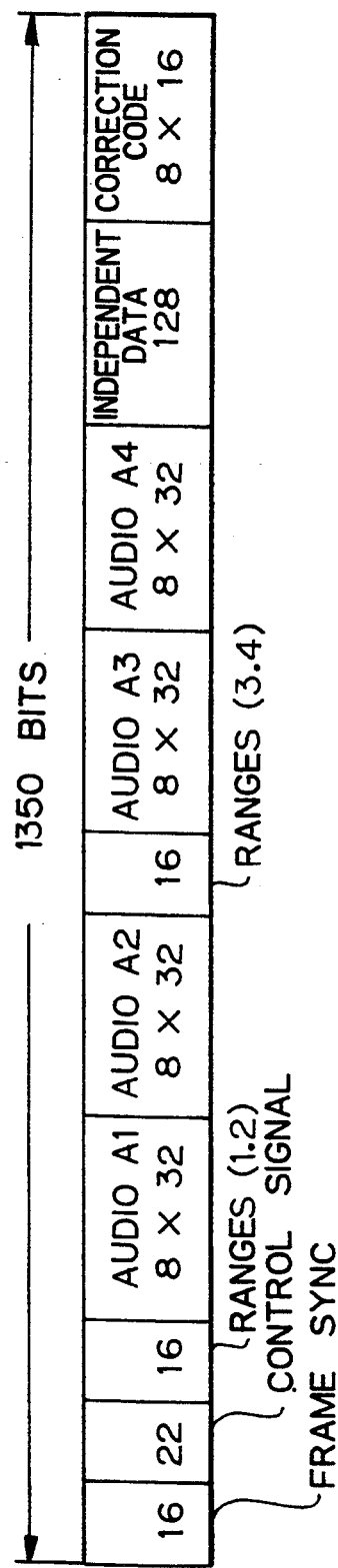
FIG. 9 is a schematic diagram for explaining a MUSE audio transmission system.
Figure 10:
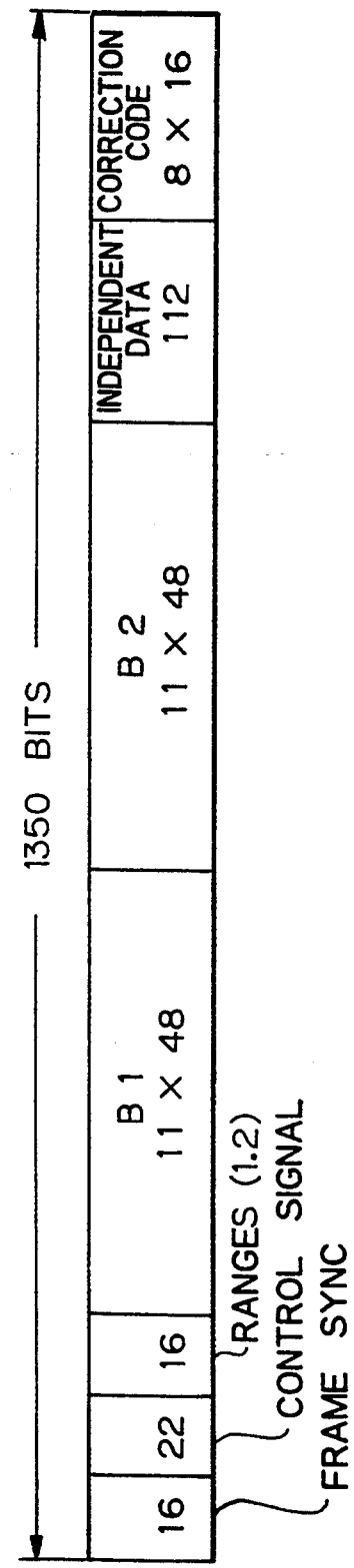
FIG. 10 is a schematic diagram for explaining the MUSE audio transmission system.

FIG. 9 is a schematic diagram showing a transmission format of the A mode. FIG. 10 is a schematic diagram showing a transmission format of the B mode. As shown in FIGS. 9 and 10, audio data is transmitted on frame (audio frame) by frame basis. The data amount of one fame is 1350 bits irrespective of the A mode or the B mode. At the beginning of an audio frame, a frame sync of 16 bits is disposed. The pattern of the frame sync is (0001001101011110).

The frame sync is followed by a control code of 22 bits. FIG. 11 is a table showing the construction of the control code. As shown in FIG. 11, the control code is used to transmit information which contains audio mode, type of stereo/monaural, presence/absence of scrambling, and so forth. In addition, the control code contains an audio output mute bit (mute flag). The audio output mute bit is disposed at the 16-th bit of the control code of 22 bits. When the value of the audio output mute bit is "0", the MUSE decoder performs an audio reproduction. On the other hand, when the value of the audio output mute bit is "1", the MUSE decoder mutes the audio reproduction.

As shown in FIG. 9, in the A mode, the control signal is followed by range bits for audio A1 and audio A2, followed by two channels of audio data A1 and A2. The range bits represent compression ranges. The audio data A1 and A2 are followed by range bits for audio A3 and audio A4, followed by two channels of audio data A3 and A4. Thereafter, reserved independent data of 128 bits are disposed, followed by an error correction code.

As shown in FIG. 10, in the B mode, the control code is followed by range bits for audio B1 and audio B2. Thereafter, two channels of audio data B1 and B2 are disposed, followed by reserved independent data of 112 bits, followed by an error correction code.

In addition, to cope with a burst error, this frame excluding synchronous signal and control code is interleaved at intervals of 16 bits. Such interleaving is referred to as bit interleaving.

Figure 12:
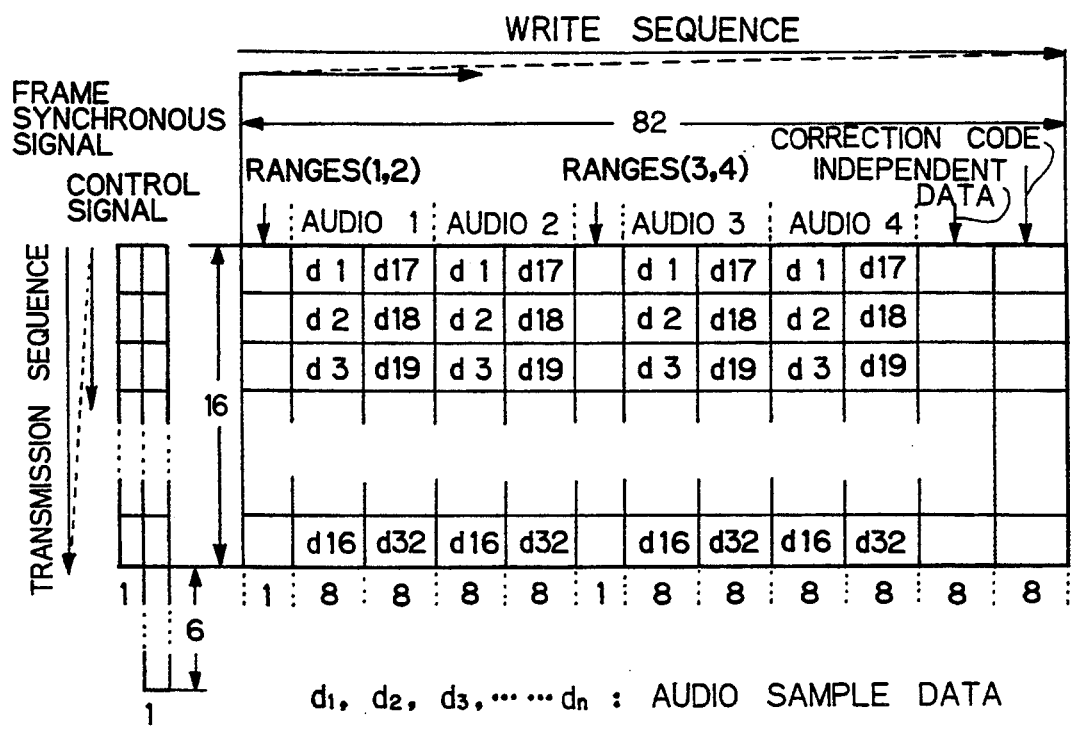
FIG. 12 is a schematic diagram for explaining the MUSE audio transmission system.

FIG. 12 is a schematic diagram showing the bit interleaving in the A mode. Data are two-dimensionally disposed in a register of (16×82). The data is horizontally written and vertically transmitted. Thus, the data are interleaved at intervals of 16 bits.

Figure 13:
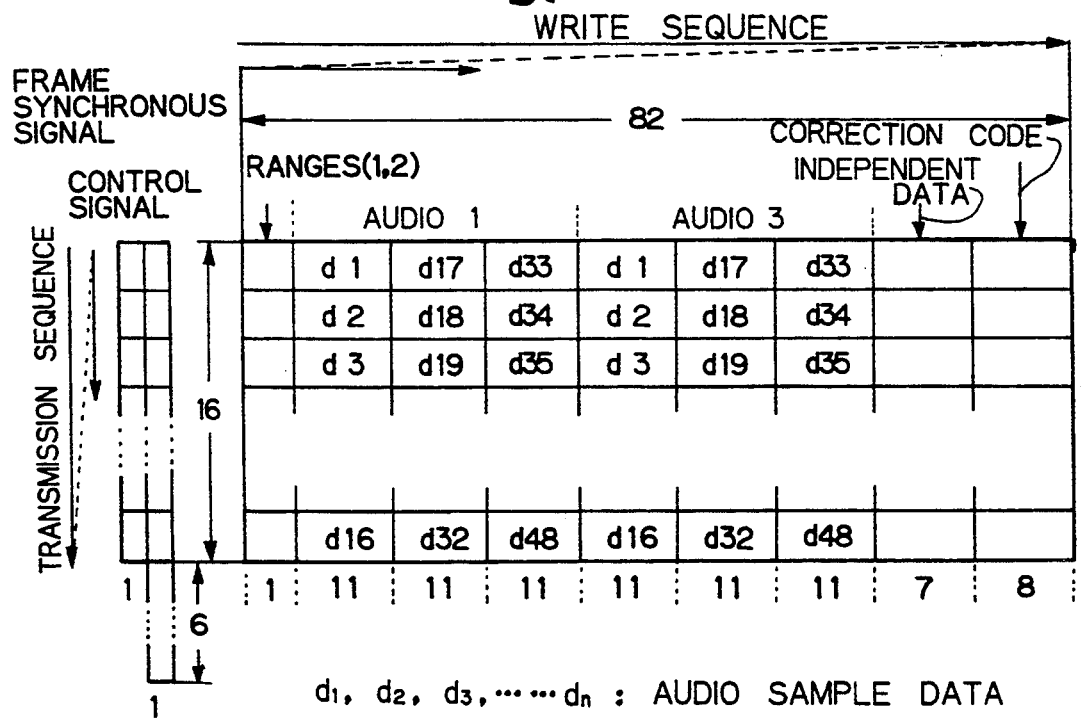
FIG. 13 is a schematic diagram for explaining the MUSE audio transmission system.

FIG. 13 is a schematic diagram showing the bit interleaving in the B mode. In the B mode, data are also two-dimensionally disposed in a register of (16×82). The data are horizontally written and vertically transmitted. Thus, the data are interleaved at intervals of 16 bits.

In addition, the bit interleaved frames including a synchronous signal and a control code are interleaved at intervals of 25 frames. This interleaving is referred to as frame interleaving.

FIG. 14 is a schematic diagram for explaining the frame interleaving process. In FIG. 14, shift registers 16-1, 61-2, ..., 61-23, and 61-24 are shift registers each having 1350 bits (equivalent to one audio frame). Outputs between each adjacent shift register are supplied to a selector 62. The outputs of the shift registers 61-1, 61-2, ... and so forth are data P1, P2, P3, ... and so forth which are a total of 25 frames.

First, the selector 62 is switched so that the data P1 are selected. Next, the selector 62 is switched so that the data P2, P3, ... and so forth are output one after the other. Thus, the frames are interleaved at intervals of 25 frames.

The data which has been bit interleaved and frame interleaved are converted from bi-state data into tri-state data according to a table shown in FIG. 15.

The table shown in FIG. 15 has two columns which read three-bit bi-state data and corresponding two samples of tri-state data disposed on the left and right, respectively. The bi-state/tri-state conversion results in lowering the transmission rate.

In other words, three-bit bi-state data shown in FIG. 16A are converted into two samples of tri-state data shown in FIG. 16B. Comparison of a period of t1 of bi-state data with a period of t2 of tri-state data show that the bi-state/tri-state conversion prolongs the period when the same information amount of data are transmitted, thereby lowering the transmission rate.

The data rate which has been bi-state/tri-state and frequency converted is 12.15 MHz. Thus, the data are multiplexed in a vertical blanking interval of a video signal after its is properly frequency converted.

Figure 17:
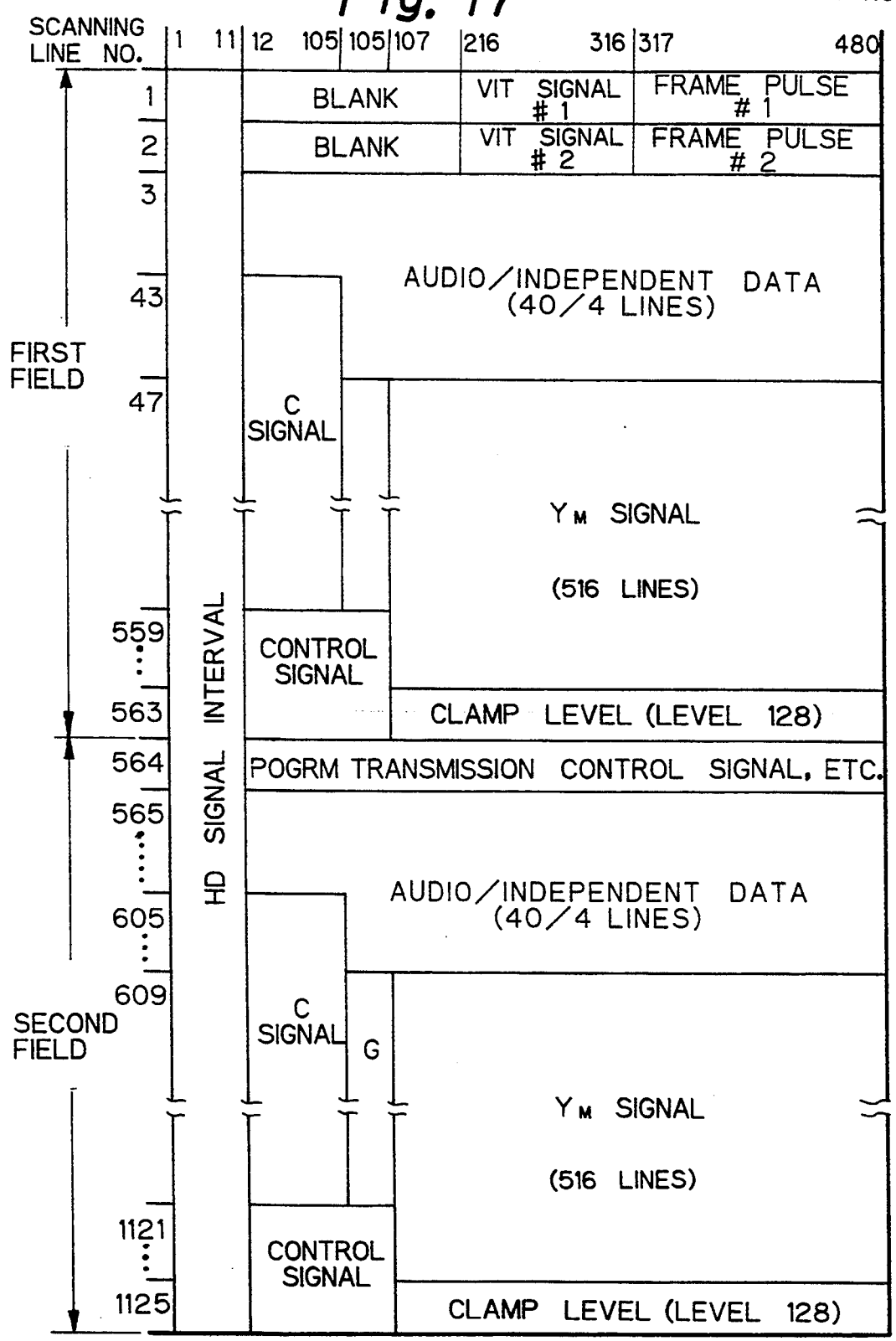
FIG. 17 is a schematic diagram for explaining the MUSE audio transmission system.

FIG. 17 is a schematic diagram showing the transmission format of a signal transmitted with one frame of the MUSE system. As shown in FIG. 17, on line 3 to line 42 and on line 565 to line 604, a horizontal synchronous signal interval is followed by audio data. On line 43 to line 46 and on line 605 to line 608, a chrominance signal is followed by an audio signal.

d. An example of MUSE decoder

Figure 18:
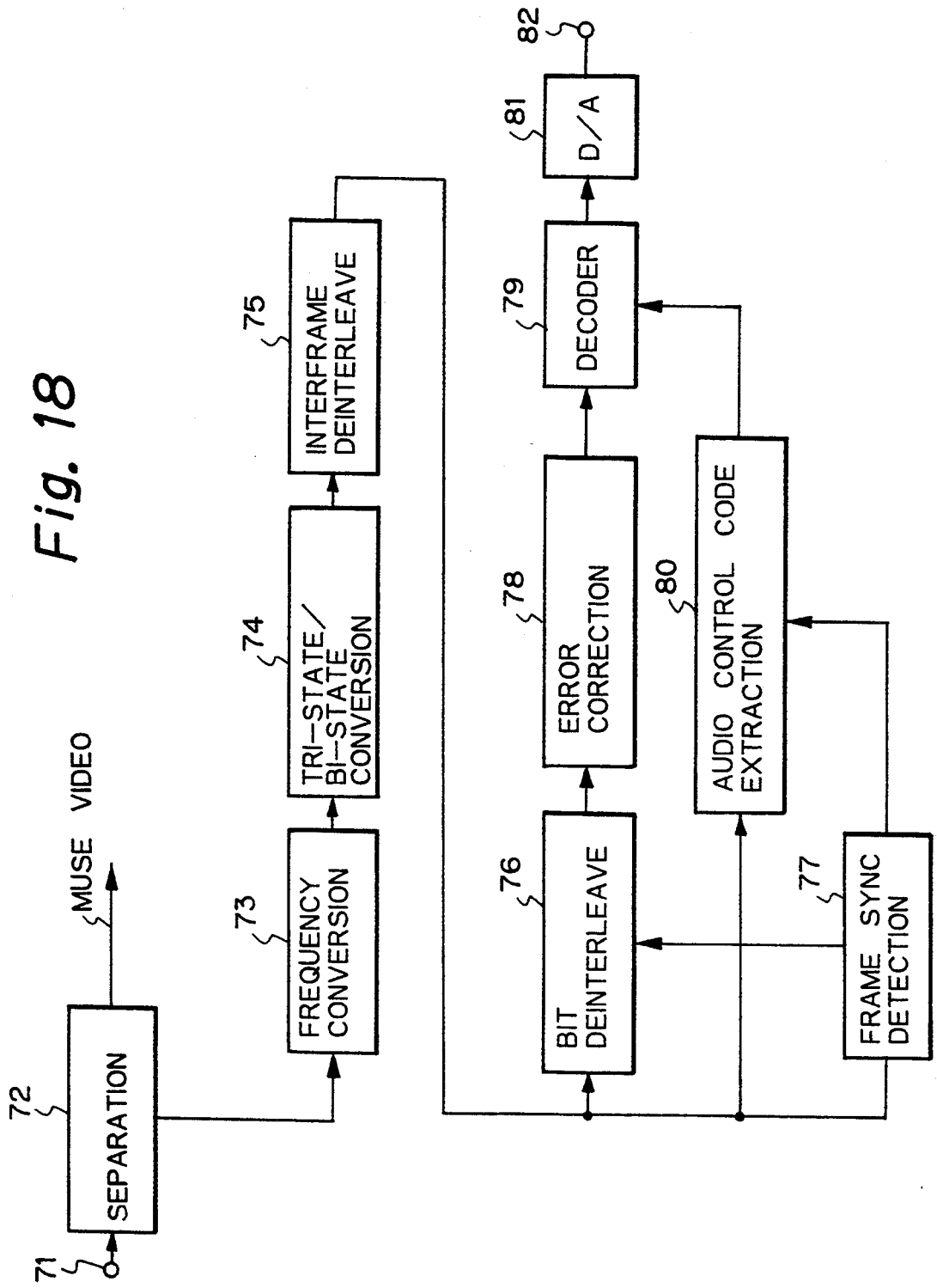
FIG. 18 is a block diagram showing the construction of an example of a MUSE decoder.

FIG. 18 is a block diagram of a MUSE decoder which decodes the above-described MUSE audio signal. In FIG. 18, a MUSE signal is supplied to an input terminal 71. The MUSE signal is supplied to a video/audio separation circuit 72. The video/audio separation circuit 72 separates a MUSE video signal and an audio signal which has been time-division multiplexed in a vertical blanking interval of the MUSE signal.

The MUSE audio signal received from the video/audio separation circuit 72 is frequency converted through a frequency conversion circuit 73. An output of the frequency conversion circuit 73 is supplied to a tri-state/bi-state conversion circuit 74. The tri-state/bi-state conversion circuit 74 converts two samples of tri-state data into three-bit bi-state data according to the table shown in FIG. 15.

An output of the tri-state/bi-state conversion circuit 74 is supplied to an interframe de-interleave circuit 75. The interframe de-interleave circuit 75 de-interleaves the data frame-interleaved at intervals of 25 frames. An output of the interframe de-interleave circuit 75 is supplied both to a bit de-interleave circuit 76 and a frame sync detection circuit 77.

The frame sync detection circuit 77 detects a frame sync disposed at the beginning of an audio frame (see FIGS. 9 and 10). Based on the frame sync, the position of data of an audio frame is detected. The bit de-interleave circuit 76 de-interleaves the data frame-interleaved at intervals of 16 bits. An output of the bit de-interleave circuit 76 is supplied to an error correction circuit 78.

The error correction circuit 78 performs an error correction process with an error correction code added to each frame. An output of the error correction circuit 78 is supplied to a decoder 79.

With the frame sync timing detected by the frame sync detection circuit 77, an audio control code extraction circuit 80 extracts a control code of an audio frame (see FIGS. 9 and 10). According to the control code, the operation of the decoder 79 is controlled.

The decoder 79 decodes the audio compression code based on DPCM. The decoder 79 decodes the compressed code into audio data. The audio data is supplied to a D/A converter 81. The D/A converter 81 converts the digital audio signal into an analog audio signal. The analog audio signal is supplied from an output terminal 82.

In the MUSE decoder shown in FIG. 18, when the audio output mute bit contained in the audio control code has been turned on, the audio control code is detected by the audio control code extraction portion 80 so as to mute the output of the decoder 79. Thus, when the audio reproduction is interrupted for example by a reproduction stop operation or a power off operation, with the audio control code which has been turned on, an occurrence of a noise can be prevented.

e. Relation between audio frame and audio data placed in vertical blanking interval When the audio reproduction is interrupted for example just before the reproduction is stopped or just before the power is turned off, an occurrence of a noise can be prevented by turning on the audio control code. However, in the MUSE system, the locking phase of an audio frame for each vertical blanking interval is indeterminate. Thus, it is difficult to detect the position of the audio output mute bit by using the vertical blanking signal.

In other words, as described above, audio data are converted from bi-state data into tri-state data and then transmitted. The data rate at which the bi-state/tri-state conversion is performed is 12.15 MHz. The bi-state/tri-state converted data are time-division multiplexed with a video signal having a frequency of 16.2 MHz.

Each audio frame is composed of 1350 bits. The bi-state/tri-state conversion causes the data amount of each audio frame to decrease to 900 samples (because $1350 \times (\frac{2}{3}) = 900$ samples)). The frequency conversion causes the data amount of each audio frame to increase to 1200 samples (because $900 \times 16.2/12.15 = 1200$ samples). In other words, at data rate of 16.2 MHz which is the frequency of a video signal, each audio frame is composed of 1200 samples.

As shown in FIG. 19A (and FIG. 17), with respect to the MUSE signal, on line 3 to line 42 and on line 565 to line 604, only audio data is placed. The amount of the audio data which can be placed onto 40 lines which are from line 3 to line 42 and from line 565 to line 604 is 464 bits.

As shown in FIG. 19B (and FIG. 17), on line 43 to line 46 and on line 605 to line 608, a chrominance signal and audio data are placed. The amount of the audio data which can be placed onto four lines from line 43 to line 46 and from 605 to line 608 is 360 bits.

Thus, the amount of the audio data of each vertical blanking interval is (464 bits×40)+(360 bits×4)=20 kbits.

The data amount of one audio frame is 1200 samples at data rate of 16.2 MHz. Since the amount of the audio data of each vertical blanking interval is 20 kbits, the number of audio frames in each vertical blanking interval is 20 k/1200=(16+⅔) frames.

Thus, the number of audio frames which can be placed in one vertical blanking interval is 16 and ⅔ frames. Therefore, in one frame of a video signal, (33+⅓) audio frames which are twice of the number of frames of one audio frame are placed.

As described above, in the MUSE system, the relation between the data amount of each audio frame and the data amount placed in each vertical blanking interval cannot be expressed by integer values. In addition, the relation between the start position of each blanking interval and the start position of an audio frame is indeterminate. However, since the remainder of the number of audio frames in one blanking interval is ⅔, the relation of the position of an audio frame against a video frame is restored at intervals of three fields (or three frames).

f. First example of mute flag preset control circuit

Next, an example of the construction of the mute flag preset control circuit 16 shown in FIG. 4 will be described. As described earlier, the mute flag preset control circuit 16 turns on the audio output mute bit contained in the control code of an audio frame when an error takes place due to a stop of the audio reproduction for example when the power is turned off, when the reproduction is stopped, or when a special play mode is performed.

FIG. 20 is a block diagram showing the construction of a first example of the mute flag preset control circuit 16. In this example, a frame sync contained in an audio frame is detected so as to locate the position of the audio output mute bit.

In FIG. 20, a MUSE signal which has been reproduced from an optical disc and FM modulated is supplied to an input terminal 100. The MUSE signal is supplied to a video/audio separation circuit 101. The video/audio separation circuit 101 separates a MUSE audio signal from a MUSE video signal. The MUSE video signal is supplied to a delay circuit 102, whereas the MUSE audio signal is supplied to a frequency conversion circuit 103.

The frequency conversion circuit 103 samples the MUSE audio signal separated by the video/audio separation circuit 101 with a 12.15 MHz clock which is synchronous with a clock of the signal. An output of the frequency conversion circuit 103 is supplied to a tri-state/bi-state conversion circuit 104.

The tri-state/bi-state conversion circuit 104 is used to restore tri-state data into bi-state data. Thus, the tri-state/bi-state conversion circuit 104 restores tri-state data into bi-state data. An output of the tri-state/bi-state conversion circuit 104 is supplied to an interframe de-interleave circuit 105. The interframe de-interleave circuit 105 de-interleaves data frame-interleaved at intervals of 25 frames.

An output of the interframe de-interleave circuit 105 is supplied to a frame sync detection circuit 106. The frame sync detection circuit 106 detects a frame sync disposed at the beginning of an audio frame. An output of the frame sync detection circuit is supplied to a mute flag position detection circuit 107.

When a frame sync is detected, the position of the audio output mute bit contained in the control code can be detected (see FIGS. 9 to 11). The mute flag position detection circuit 107 detects the position of the audio output mute bit according to the frame sync. An output of the mute flag position detection circuit 107 is supplied to a flag setting circuit 108.

When the audio output mute bit is turned on, a mute flag setting signal is supplied from a terminal 109. The mute flag setting signal causes the flag setting circuit 108 to turn on the audio output mute bit.

An output of the flag setting circuit 108 is supplied to an interframe interleave circuit 110. The interframe interleave circuit 110 interleaves frames at intervals of 25 frames. An output of the interframe interleave circuit 110 is supplied to a bi-state/tri-state conversion circuit 111. The bi-state/tri-state conversion circuit 111 converts bi-state data into tri-state data.

An output of the bi-state/tri-state conversion circuit 111 is supplied to a frequency conversion circuit 112. The frequency conversion circuit 112 converts the frequency of the input data. An output of the frequency conversion circuit 112 is supplied to a video/audio multiplexing circuit 113.

The MUSE video signal is supplied to the video/audio multiplexing circuit 113 through the delay circuit 102. In a vertical blanking interval of the MUSE video signal, the audio signal is supplied from the frequency conversion circuit 112.

The delay circuit 102 accords with the overall time for the frequency conversion of the audio signal, the tri-state/bi-state conversion, the interframe de-interleaving, the frame sync detection, the detection of the position of the mute flag based on the frame sync, the mute flag setting (when necessary), the interframe interleaving, the hi-state/tri-state conversion, the frequency conversion, and the time-division multiplexing of audio signal in video signal.

The video/audio multiplexing circuit 113 compresses the time base of the audio signal and places the signal in a vertical blanking interval of the MUSE video signal. The resultant signal is supplied from an output terminal 114.

In this embodiment, a frame sync is detected so as to detect the position of the audio output mute bit. Thus, the processes which separate an audio signal, convert the frequency thereof, convert tri-state data into bi-state data, interframe de-interleave the hi-state data, detect a frame sync, detect the position of the audio output mute bit according to the frame sync, set the mute flag (when necessary), interframe interleave data, convert bi-state data into tri-state data, convert the frequency of the tri-state data, and time-division multiplex the audio signal in the video signal are required. Thus, a relatively large number of process steps are required, and the circuit scale of the apparatus is relatively increased.

g. Second example of mute flag preset control circuit

Figure 21:
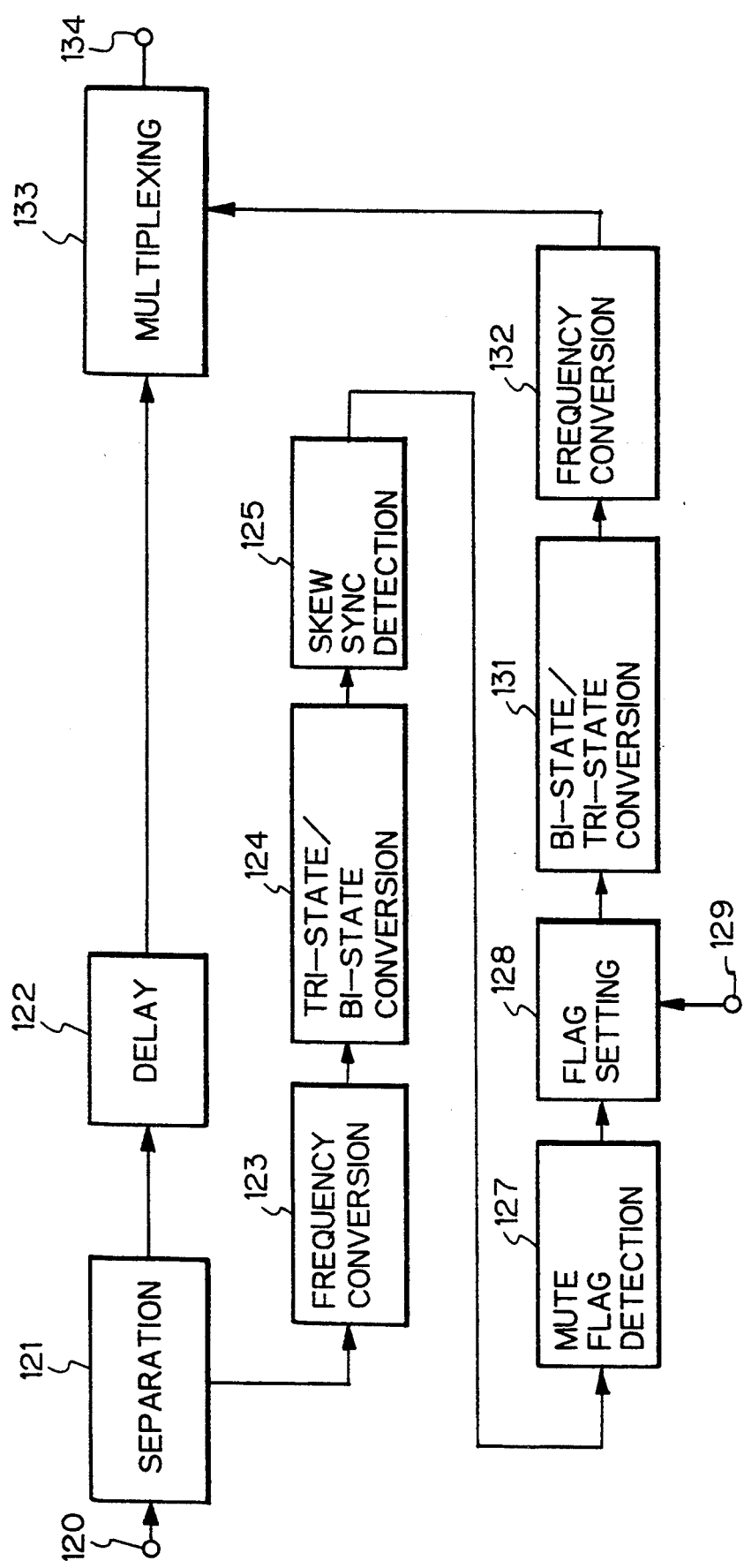
FIG. 21 is a block diagram showing the construction of a second example of a mute flag preset control circuit to which the present invention has been applied.

FIG. 21 is a block diagram showing the construction of a second example of the mute flag preset control circuit 16. In this embodiment, the position of the audio output mute bit is detected without interframe-de-interleaving.

Figure 22:
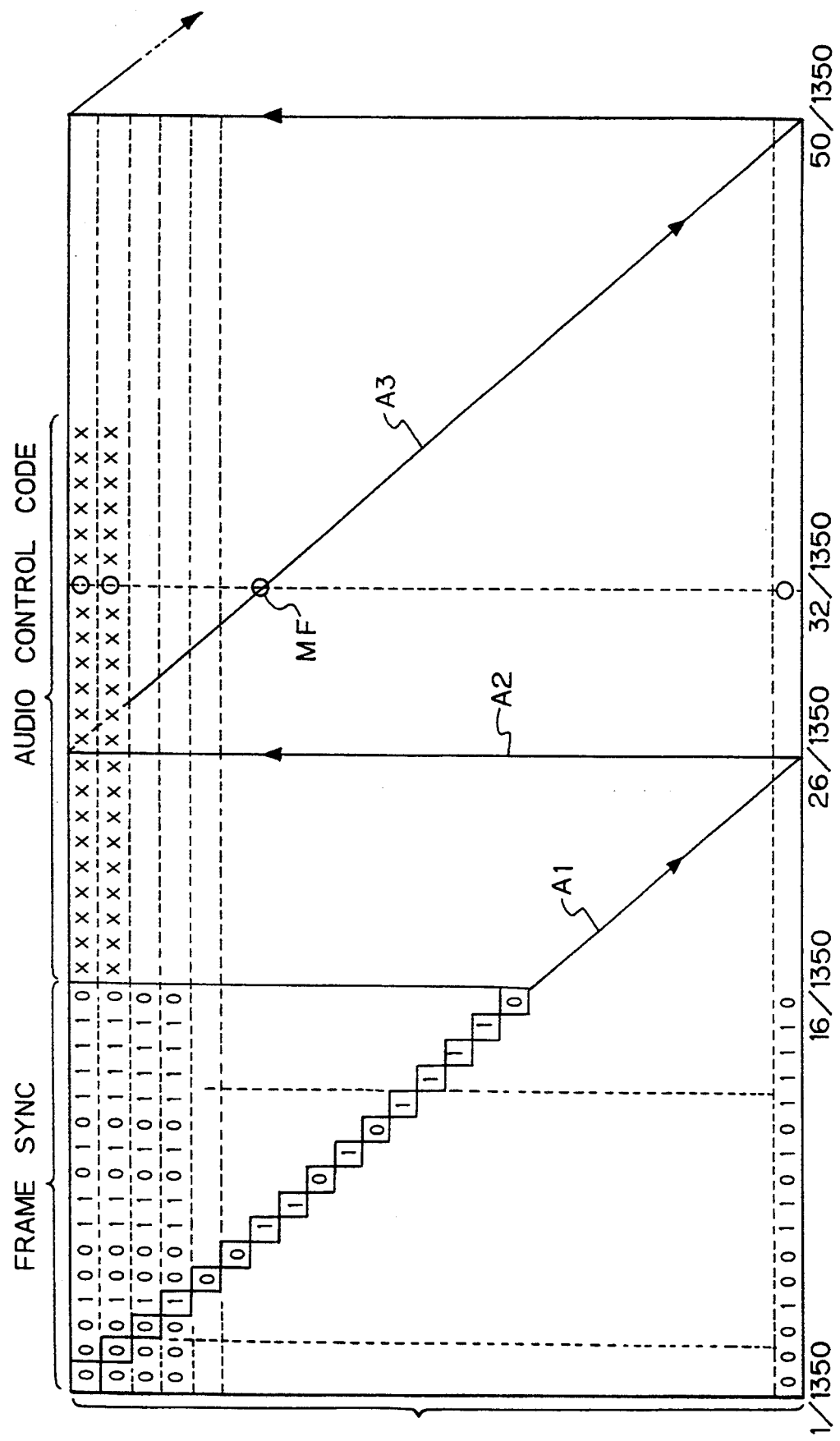
FIG. 22 is a schematic diagram for explaining the mute flag preset control circuit to which the present invention has been applied.

As described above, a frame sync has a pattern of (0001001101011110). As shown in FIG. 22, when data of 25 frames are interleaved, data are output in the order of arrows A1, A2, and A3 in succession. At this time, the frame interleaving at intervals of 25 frames results in a skew sync pattern ASYNC (0001001101011110).

Thus, the position of the audio output mute bit may be detected by detecting the position of the skew sync pattern ASYNC without interframe-de-interleaving. In the embodiment shown in FIG. 21, with the skew sync, the position of the audio output mute bit is detected.

In FIG. 21, a MUSE signal which has been reproduced from an optical disc and FM demodulated is supplied to an input terminal 120. The MUSE signal is supplied to a video/audio separation circuit 121. The video/audio separation circuit 121 separates a MUSE audio signal from a MUSE video signal. The MUSE video signal is supplied to a delay circuit 122, whereas the MUSE audio signal is supplied to a frequency conversion circuit 123.

The frequency conversion circuit 123 samples the MUSE audio signal which has been separated by the video/audio separation circuit 121 at a 12.15 MHz clock which is synchronous with a clock of the signal. An output of the frequency conversion circuit 123 is supplied to a tri-state/bi-state conversion circuit 124.

The tri-state/bi-state conversion circuit 124 is used to restore tri-state data to bi-state data. The tri-state/bi-state conversion circuit 124 restores tri-state data to bi-state data. An output of the tri-state/bi-state conversion circuit 124 is supplied to a skew sync detection circuit 125.

The skew sync detection circuit 125 detects the skew sync pattern ASYNC. An output of the skew sync detection circuit 125 is supplied to a mute flag position detection circuit 127.

As shown in FIG. 22, with the skew sync pattern ASYNC, the position of the audio output mute bit MF spaced apart from the skew sync pattern by a predetermined distance can be detected. The mute flag position detects circuit 127 detects the position of the audio output mute bit MF according to the skew sync pattern ASYNC. An output of the mute flag position detection circuit 127 is supplied to a flag setting circuit 128.

When the audio output mute bit is turned on, a mute flag setting signal is supplied from a terminal 129. The mute flag setting signal causes the flag setting circuit 128 to turn on the audio output mute bit.

An output of the flag setting circuit 128 is supplied to a bi-state/tri-state conversion circuit 131. The bi-state/tri-state conversion circuit 131 converts bi-state data into tri-state data. An output of the bi-state/tri-state conversion circuit 131 is supplied to a frequency conversion circuit 132. The frequency conversion circuit 132 converts the frequency of the input data. An output of the frequency conversion circuit 132 is supplied to a video/audio multiplexing circuit 133.

The MUSE video signal is supplied to the video/audio multiplexing circuit 133 through the delay circuit 122. The audio signal received from the frequency conversion circuit 122 is supplied in a vertical blanking interval of the MUSE video signal.

The delay circuit 122 accords with the overall time for the frequency conversion of the audio signal, the tri-state/bi-state conversion, the detection of the skew sync, the detection of the mute flag according to the skew sync, the setting of the audio output mute bit (when necessary), the bi-state/tri-state conversion, the frequency conversion, and the time-division multiplexing of the audio signal in the video signal.

h. Third example of mute flag preset control circuit

Figure 23:
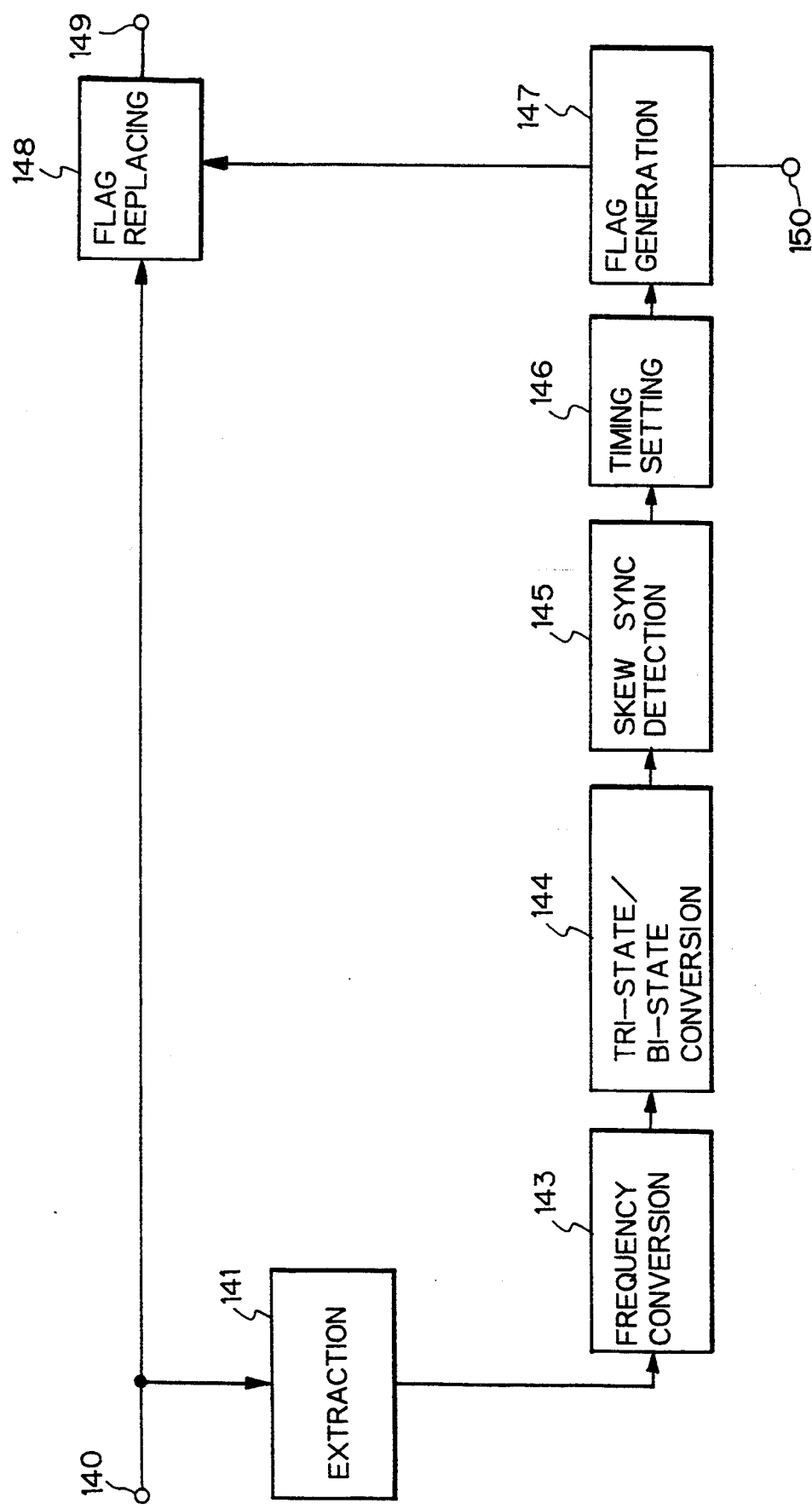
FIG. 23 is a block diagram showing the construction of a third example of a mute flag preset control circuit to which the present invention has been applied.

FIG. 23 is a block diagram showing the construction of a third example of the mute flag preset control circuit. In the examples shown in FIGS. 19 and 20, the MUSE video signal and the audio signal are separated. When necessary, the audio output mute bit of an audio frame is turned on. Thereafter, the MUSE video signal and the audio signal are multiplexed. On the other hand, in the third example, without a separation of a MUSE video signal from a MUSE audio signal, the audio output mute bit of an audio frame of the MUSE signal is replaced.

In FIG. 23, a MUSE signal which has been reproduced from an optical disc and FM demodulated is supplied to an input terminal 140. The MUSE signal is supplied both to an audio extraction circuit 141 and a flag replacing circuit 148. The audio extraction circuit 141 extracts the MUSE audio signal. An output of the audio extraction circuit 141 is supplied to a frequency conversion circuit 143.

The frequency conversion circuit 143 samples the MUSE audio signal with a 12.15 MHz clock which is synchronous with a clock of the signal. An output of the frequency conversion circuit 143 is supplied to a tri-state/bi-state conversion circuit 144.

The tri-state/bi-state conversion circuit 144 is used to restore tri-state data to bi-state data. The tri-state/bi-state conversion circuit 144 restores tri-state data to bi-state data. An output of the tri-state/bi-state conversion circuit 144 is supplied to a skew sync detection circuit 145. The skew sync detection circuit 145 detects a skew sync pattern. With the skew sync pattern, the position of the audio output mute bit in the control code can be detected.

An output of the skew sync detection circuit 145 is supplied to a timing setting circuit 146. The timing setting circuit 146 sets a timing for which a skew sync is detected and the audio output mute bit is located. An output of the timing setting circuit 146 is supplied to a flag generation circuit 147.

When the audio output mute bit is turned on, a mute flag setting signal is supplied from a terminal 150 to the flag generation circuit 147. Thus, in the timing which is set by the timing setting circuit 146, the flag generation circuit 147 outputs a mute-on audio output mute bit. This audio output bit is supplied to a flag replacing circuit 148. The flag replacing circuit 148 replaces the value of the audio output mute bit contained in the MUSE signal received from the input terminal 140. Thus, the audio output mute bit of the MUSE signal supplied from an output terminal 149 is turned on.

i. Fourth example of mute flag preset control circuit

Figure 24:
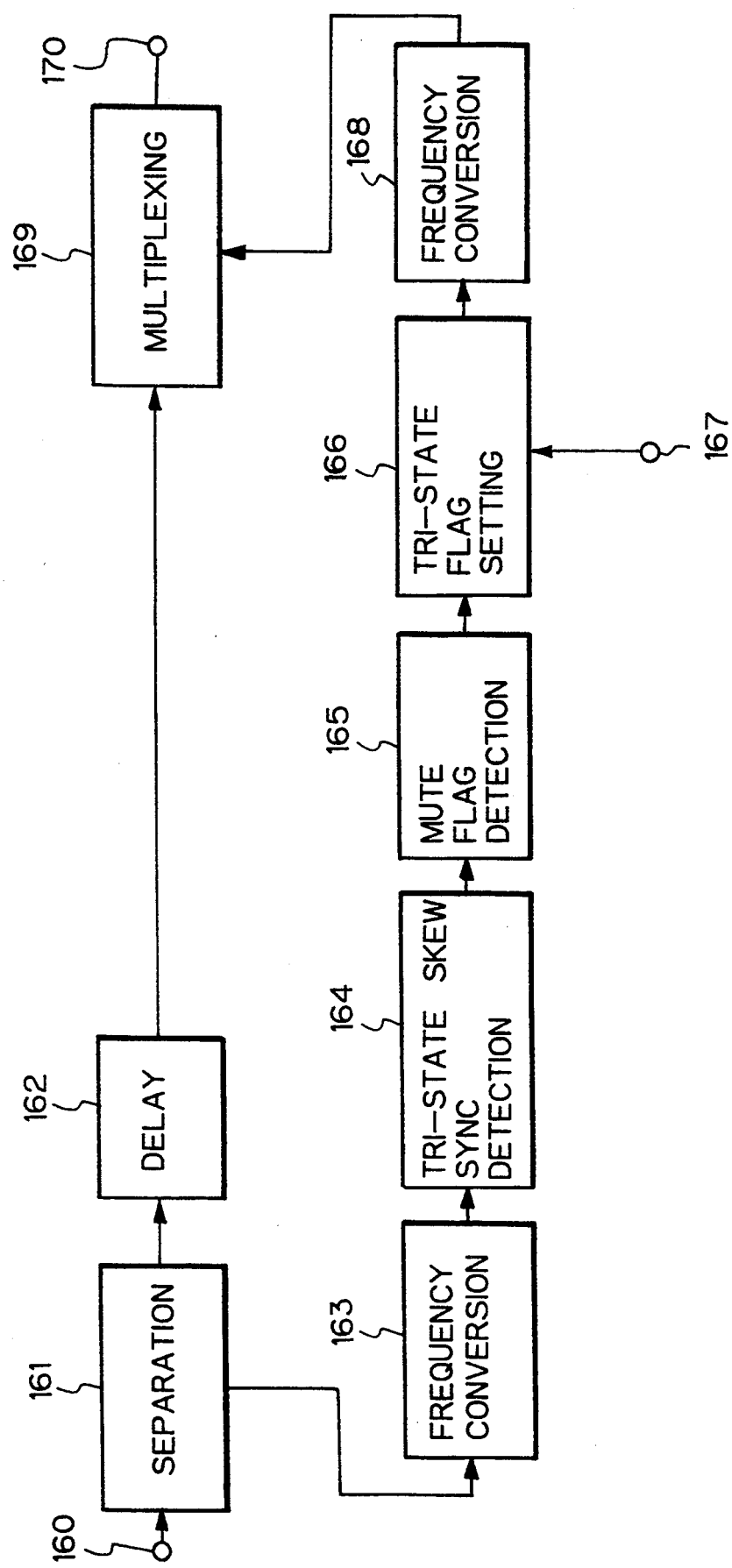
FIG. 24 is a block diagram showing the construction of a fourth example of a mute flag preset control circuit to which the present invention has been applied.

FIG. 24 is a block diagram showing the construction of a fourth example of the mute flag preset control circuit. In the above-described second and third examples, a skew sync is detected after terminal/bi-state conversion is performed. On the other hand, in the fourth example, a skew sync is directly detected from a tri-state signal. When a skew sync is directly detected from a tri-state signal, the circuit scale of the apparatus can be correspondingly decreased.

Next, a technique for detecting a skew sync directly from a tri-state signal will be described. As described above, the pattern of a skew sync is (0001001101011110). The pattern of the skew sync is converted into a tri-state value as follows. First, the skew sync pattern is divided at intervals of three bits. Thus, there are three patterns A to C that follow.

| A: | (000) | (100) | (110) | (101) | (111) | (0**) |
|---|---|---|---|---|---|---|
| B: | (*00) | (010) | (011) | (010) | (111) | (10*) |

-continued

| C: | (**0) | (001) | (001) | (101) | (011) | (110) |

Data with an asterisk (*) is indeterminate.

The three sync patterns are converted into tri-state signals as follows.

| A: | (00) | (10) | (22) | (20) | (21) | (**) |
| B: | () | (12) | (02) | (12) | (21) | () |
| C: | (**) | (01) | (01) | (20) | (02) | (22) |

Thus, when one of the patterns (0010222021), (12021221), and (0101200222) is detected, a skew sync can be detected directly from a tri-state signal. However, the position of the audio output mute bit depends on whether the sync pattern of tri-state signal is the pattern A, B, or C.

FIG. 24 is an example which directly detects a skew sync from a tri-state signal. In FIG. 24, a MUSE signal which has been reproduced from an optical disc and FM demodulated is supplied to an input terminal 160. The MUSE signal is supplied to a video/audio separation circuit 161. The video/audio separation circuit 161 separates a MUSE audio signal from a MUSE video signal. The MUSE video signal is supplied to a delay circuit 162, whereas the MUSE audio signal is supplied to a frequency conversion circuit 163.

The frequency conversion circuit 163 samples the MUSE audio signal separated by the video/audio separation circuit 161 with a 12.15 MHz clock which is synchronous with a clock of the signal. An output of the frequency conversion circuit 163 is supplied to a tri-state skew sync detection circuit 164. The tri-state skew sync detection circuit 164 detects a skew sync pattern from a tri-state signal. An output of the tri-state skew sync detection circuit 164 is supplied to a mute flag position detection circuit 165.

With the tri-state skew sync pattern, the position of a tri-state signal which is equivalent to the audio output mute bit contained in the control code can be detected. The mute flag position detection circuit 165 detects the position of the tri-state signal which is equivalent to the audio output mute bit according to a tri-state skew sync pattern. An output of the mute flag position detection circuit 165 is supplied to a tri-state flag setting circuit 166.

When the audio output mute bit is turned on, a mute flag setting signal is supplied from a terminal 167 to a tri-state flag setting circuit 166. With the mute flag setting signal, the tri-state signal corresponding to the audio output mute flag is set so that the audio output mute bit is turned on by the tri-state flag setting circuit 166.

An output of the tri-state flag setting circuit 166 is supplied to a frequency conversion circuit 168. The frequency conversion circuit 168 converts the frequency of the input signal. An output of the frequency conversion circuit 168 is supplied to a video/audio multiplexing circuit 169.

A MUSE video signal is supplied to the video/audio multiplexing circuit 169 through the delay circuit 162. The audio signal received from the frequency conversion circuit 168 is supplied in a vertical blanking interval of the MUSE video signal.

The delay circuit 162 accords with the overall time for the frequency conversion of the audio signal, the detection of the tri-state skew sync, the detection of the mute flag according to the skew flag, the setting of the audio output mute bit with a tri-state signal (when necessary), the frequency conversion, and the time-division multiplexing of the audio signal with the video signal. An output of the video/audio multiplexing circuit 169 is supplied from an output terminal 170.

j. Practical construction of tri-state skew sync detection circuit

In the examples shown in FIG. 24, a skew sync is detected directly from a tri-state signal. In the example, pattern A (0010222021), pattern B (12021221), and pattern C (0101200222) are detected.

Figure 25:
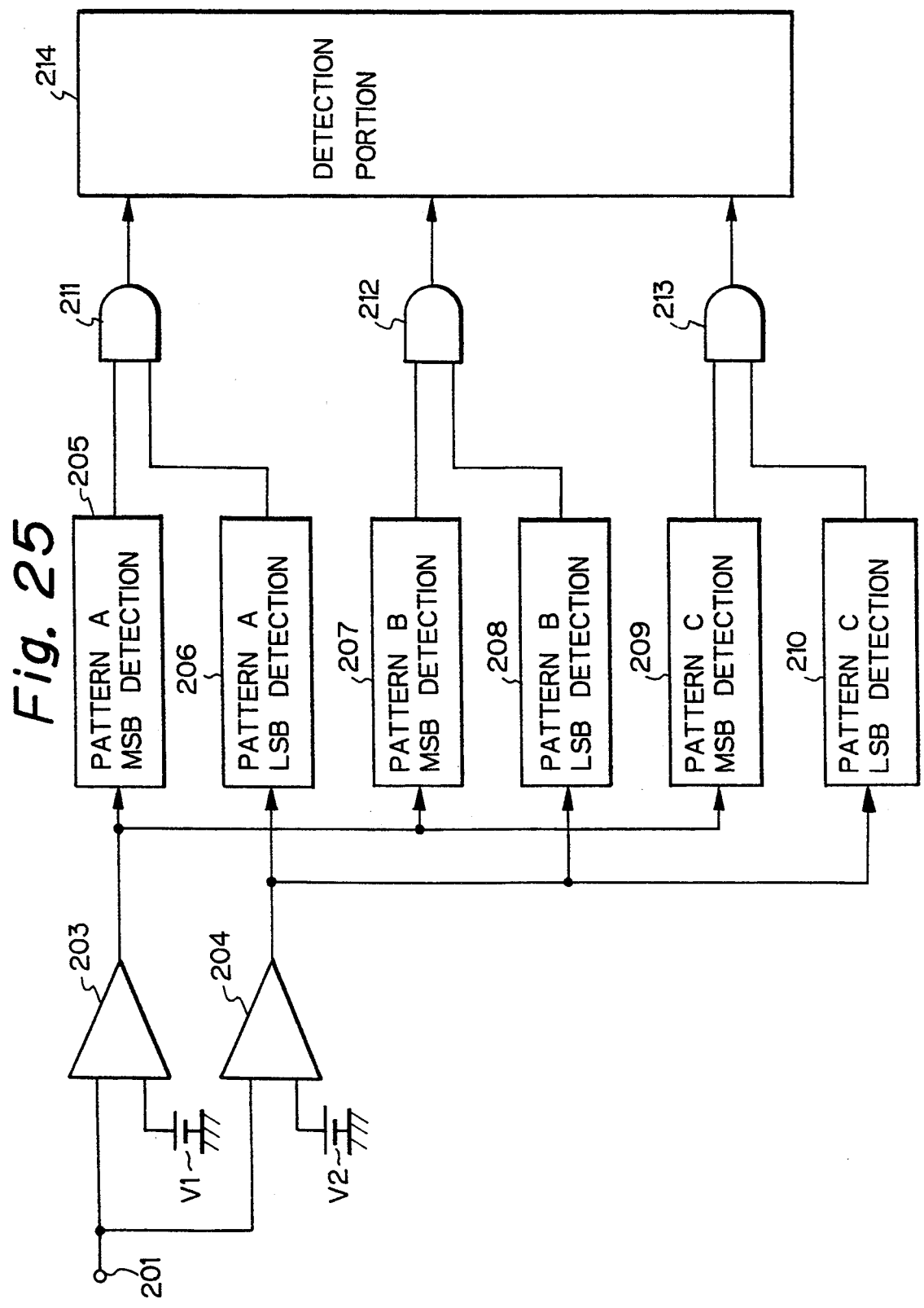
FIG. 25 is a block diagram showing the construction of an example of a skew sync detection circuit to which the present invention has been applied.

FIG. 25 is a block diagram practically showing the construction of the tri-state skew sync detection circuit which detects a skew sync pattern directly from a tri-state signal. In FIG. 25, a tri-state signal is supplied to an input terminal 201. The tri-state signal is supplied to comparators 203 and 204. In the comparators 203 and 204, reference voltages V1 and V2 are set so that the relation V1>V2 is satisfied. An output of the comparator 203 is supplied to a pattern A MSB (Most Significant Bit) detection circuit 205, a pattern B MSB detection circuit 207, and a pattern C MSB circuit 209. An output of the comparator 204 is supplied to a pattern A LSB (Least Significant Bit) detection circuit 206, a pattern B LSB detection circuit 208, and a pattern C LSB detection circuit 210.

Outputs of the pattern A MSB detection circuit 205 and the pattern A LSB detection circuit 206 are supplied to an AND gate 211. Outputs of the pattern B MSB detection circuit 207 and the pattern B LSB detection circuit 208 are supplied to an AND gate 212. Outputs of the pattern C MSB detection circuit 209 and the pattern C LSB detection circuit 210 are supplied to an AND gate 213. Outputs of the AND gates 211, 212, and 213 are supplied to a detection circuit 214. The detection circuit 214 determines whether or not a tri-state skew sync has been detected.

The tri-state signal received from the input terminal 201 is converted into a 2-bit signal by the comparators 203 and 204. When the value of the tri-state signal is "0", the outputs of the comparators 203 and 204 become "00". When the value of the tri-state signal is "1", the outputs of the comparators 203 and 204 become "01". When the value of the tri-state signal is "2", the outputs of the comparators 203 and 204 become "11".

Thus, with the pattern A (0010222021), the comparators 203 and 204 output (00) (00) (01) (00) (11) (11) (11) (00) (11) (01).

With the pattern B (12021221), the comparators 203 and 204 output (01) (11) (00) (11) (01) (11) (11) (01).

With the pattern C (0101200222), the comparators 203 and 204 output (00) (01) (00) (01) (11) (00) (00) (11) (11) (11).

The pattern A MSB detection circuit 205 determines whether or not the output of the comparator 203 accords with the MSB of the pattern A (0010222021). In other words, the pattern A MSB detection circuit 205 determines whether or not the input pattern accords with the pattern (0000111010).

The pattern A LSB detection circuit 206 determines whether or not the output of the comparator 203 accords with the LSB of the pattern A (0010222021). In other words, the pattern A LSB detection circuit 205 determines whether or not the input pattern accords with the pattern (0010111010).

The pattern B MSB detection circuit 207 determines whether or not the output of the comparator 203 accords with the MSB of the pattern B (12021221).

The pattern B LSB detection circuit 208 determines whether or not the output of the comparator 203 accords with the LSB of the pattern B (12021221).

The pattern C MSB detection circuit 209 determines whether or not the output of the comparator 203 accords with the MSB of the pattern C (0101200222).

The pattern C LSB detection circuit 210 determines whether or not the output of the comparator 203 accords with the LSB of the pattern C (0101200222).

When the input tri-state signal accords with the pattern A, an AND gate 211 generates a detection output. When the input tri-state signal accords with the pattern B, an AND gate 212 generates a detection output. When the input tri-state signal accords with the pattern C, an AND gate 213 generates a detection output.

A detection portion 214 determines whether or not a skew sync has been input according to the outputs of the AND gates 211, 212, and 213.

k. Fifth example of mute flag preset control circuit

Figure 26:
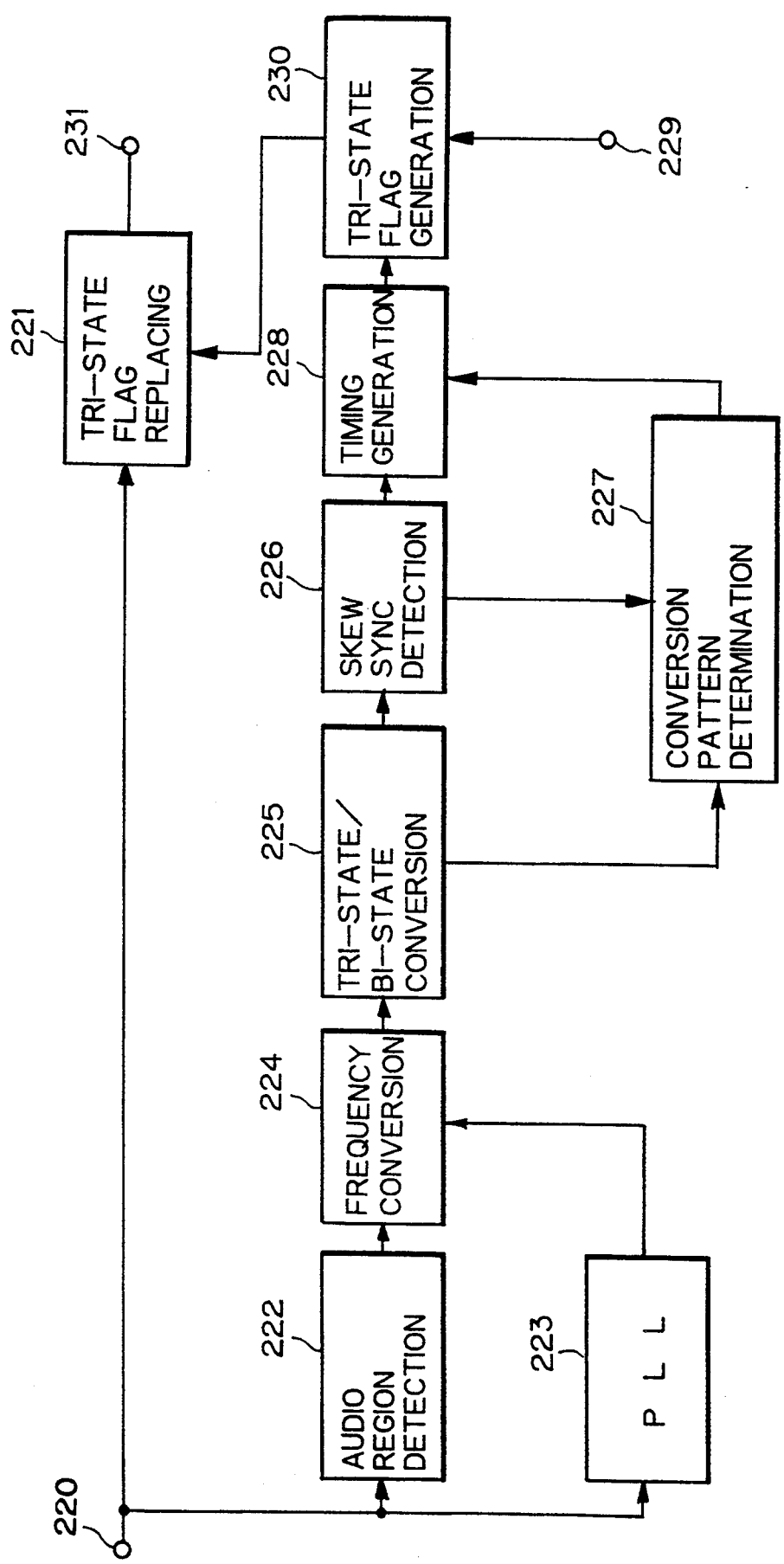
FIG. 26 is a block diagram showing the construction of a fifth example of a mute flag preset control circuit to which the present invention has been applied.

FIG. 26 is a block diagram showing the construction of a fifth example of the mute flag preset control circuit 16. In this example, the mute flag is replaced with a tri-state signal.

In FIG. 26, a MUSE signal which has been reproduced from an optical disc and FM demodulated is supplied to an input terminal 220. The MUSE signal is supplied both to a tri-state flag replacing circuit 221 and an audio region detection circuit 222. The audio region detection circuit 222 detects an audio signal in a vertical blanking interval. The MUSE signal received from the input terminal 220 is also supplied to a PLL circuit 223. The PLL circuit 223 forms a 12.15 MHz clock which is synchronous with the input MUSE signal.

An output of the audio region detection circuit 222 is supplied to a frequency conversion circuit 224. The frequency conversion circuit 224 samples the MUSE audio signal with the 12.15 MHz clock supplied from the PLL circuit 223. An output of the frequency conversion circuit 224 is supplied to a tri-state/bi-state conversion circuit 225. The tri-state/bi-state conversion circuit 225 converts the tri-state signal into a bi-state signal. An output of the tri-state/bi-state conversion circuit 225 is supplied both to a skew sync detection circuit 226 and a conversion pattern determination circuit 227.

The skew sync detection circuit 226 detects a skew sync pattern. The skew sync pattern is supplied both to a timing generation circuit 228 and a conversion pattern determination circuit 227. The conversion pattern determination circuit 227 determines whether or not the input tri-state signal pattern is the pattern A, B, or C.

An output of the skew sync generation circuit 226 is supplied to a timing generation circuit 228. The conversion pattern determination circuit 227 supplies a pattern determination signal which represents the type of the sync pattern to the timing generation circuit 228. The timing generation circuit 228 sets a timing for which a skew sync is detected and a tri-state signal equivalent to the audio output mute bit is output.

When the audio output mute bit is turned on, a mute flag setting signal is supplied from a terminal 229 to a tri-state flag generation circuit 230. With the mute flag setting signal, the tri-state flag generation circuit 230 sets a tri-state signal according to the on state of the audio output mute bit.

An output of the tri-state flag setting circuit 230 is supplied to a tri-state replacing circuit 221. The tri-state replacing circuit 221 replaces the value of the tri-state signal equivalent to the audio output mute bit of the MUSE signal. An output of the tri-state replacing circuit 221 is supplied from an output terminal 231.

l. Sixth example of mute flag preset control circuit

Figure 27:
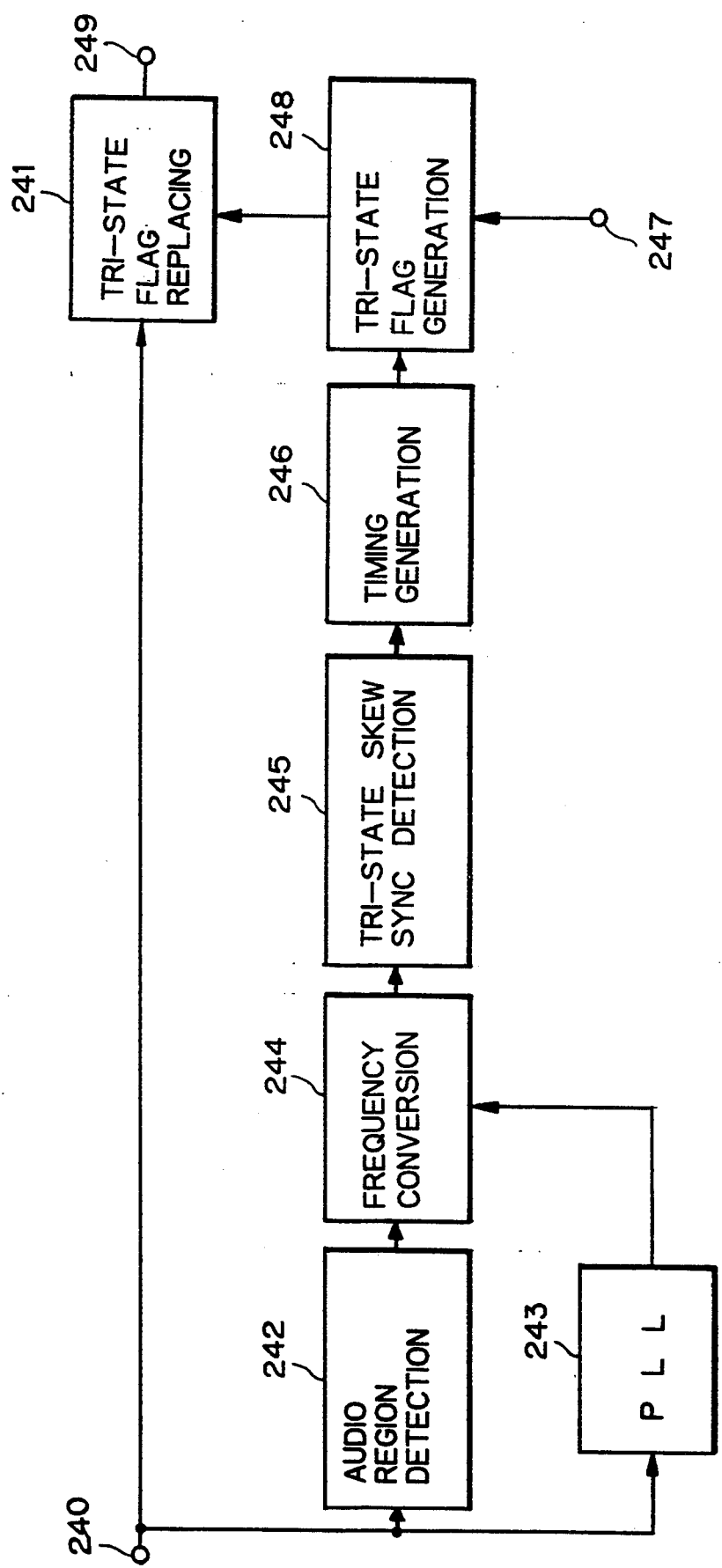
FIG. 27 is a block diagram showing the construction of a sixth example of a mute flag preset control circuit to which the present invention has been applied.

FIG. 27 is a block diagram showing the construction of a sixth example of the mute flag preset control circuit. In the fifth example, after a tri-state signal is converted into a bi-state signal, a skew sync is detected. In this sixth example, a skew sync is detected from a tri-state signal.

In FIG. 27, a MUSE signal which has been reproduced from an optical disc and FM demodulated is supplied to an input terminal 240. The MUSE signal is supplied both to a tri-state replacing circuit 241 and an audio region detection circuit 242. The audio region detection circuit 242 detects an audio signal in a vertical blanking interval. The MUSE signal received from the input terminal 240 is supplied to a PLL circuit 243. The PLL circuit 243 forms a 12.15 MHz clock which is synchronous with the input MUSE signal.

An output of the audio region detection circuit 242 is supplied to a frequency conversion circuit 244. The frequency conversion circuit 244 samples the MUSE audio signal with the 12.15 MHz clock received from the PLL circuit 243. An output of the frequency conversion circuit 244 is supplied to a tri-state skew sync detection circuit 245.

The tri-state skew sync detection circuit 245 detects a skew sync pattern from a tri-state signal. An output of the tri-state skew sync detection circuit 245 is supplied to a timing generation circuit 246. The timing generation circuit 246 sets a timing for which a skew sync is detected and a tri-state signal equivalent to the audio output mute bit is output.

When the audio output mute bit is turned on, a mute flag setting signal is supplied from a terminal 247 to a tri-state flag generation circuit 248. With the mute flag setting signal, the tri-state flag generation circuit 248 sets a tri-state signal equivalent to the on state of the audio output mute bit.

An output of the tri-state flag setting circuit 248 is supplied to a tri-state replacing circuit 241. The tri-state replacing circuit 241 replaces the value of the tri-state signal equivalent to the audio output mute bit of the MUSE signal. An output of the tri-state replacing circuit 241 is supplied from an output terminal 249.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. An audio visual information signal reproducing apparatus for reproducing an audio visual information signal from a recording medium, said audio visual information signal being recorded on said recording medium and composed of a video signal and a digitized audio signal being time-division multiplexed in such a way that the frame interval of said video signal does not accord with the frame interval of said digitized audio signal, comprising:

means for extracting said digitized audio signal from said audio visual information signal;

means for receiving said extracted audio visual information signal and for generating an audio visual mute flag when said extracted digitized audio signal indicates an interruption of a normal play mode;

means for replacing an audio output mute flag of a control code contained in said digitized audio signal of said audio visual information signal responsive to said audio output mute flag generated in said extracted digitized audio signal; and means for shifting to a next operation mode responsive to said audio output mute flag of said control code contained in said digitized audio signal of said audio visual information signal being set.

2. An audio visual information signal reproducing apparatus for reproducing an audio visual information signal from recording medium, said audio visual information signal being recorded on said recording medium and composed of a video signal and a digitized audio signal being time-division multiplexed in such a way that the frame interval of said video signal does not accord with the frame interval of said digitized audio signal, comprising:

means for separating said digitized audio signal and said video signal from said audio visual information signal being reproduced;

means for setting an audio output mute flag of said separated digitized audio signal in response to an interruption of a normal play mode;

means for delaying said video signal;

means for multiplexing said separated digitized audio signal, with said audio output mute flag set, with said delayed video signal to produce a multiplexed audio visual information signal;

means for outputting said multiplexed audio visual information signal; and means for shifting to a next operation mode responsive to said audio output mute flag being set.

3. An audio visual information signal reproducing apparatus for reproducing an audio visual information signal from a recording medium, said audio visual information signal being recorded on said recording medium and composed of a video signal and a digitized audio signal being time-division multiplexed in such a way that the frame interval of said video signal does not accord with the frame interval of said digitized audio signal, comprising:

means for detecting said digitized audio signal in said audio visual information signal;

means for converting said digitized audio signal contained in said audio visual information signal being reproduced into a tri-state audio data signal by a frequency conversion;

means for detecting a skew sync signal responsive to said tri-state audio data signal;

means for creating a timing signal responsive to said skew sync signal being detected; and means for setting an audio output mute flag of a control code contained in said digitized audio signal of said audio visual information signal being reproduced responsive to said timing signal; and means for shifting to a next operation mode responsive to said audio output mute flag being set wherein said apparatus sets said audio output mute flag on a substantially real time basis without separating said video signal and said digitized audio signal of said audio visual information signal being reproduced.

4. An audio visual information signal reproducing apparatus for reproducing an audio visual information signal from a recording medium, said audio visual information signal being recorded on said recording medium and composed of a video signal and a digitized audio signal being time-division multiplexed in such a way that the frame interval of said video signal does not accord with the frame interval of said digitized audio signal, comprising:

means for detecting said digitized audio signal in said audio visual information signal;

means for converting said digitized audio signal of said audio visual information signal being reproduced into a tri-state audio data signal by a frequency conversion;

means for converting said tri-state audio data signal into a bi-state data signal;

means for detecting a skew sync signal in said bi-state data signal;

means for creating a timing signal responsive to said skew sync signal being detected;

means for setting an audio output mute flag of a control code contained in said digitized audio signal of said audio visual information signal being reproduced in response to an interruption of a normal play mode responsive to said timing signal; and means for shifting to a next operation mode responsive to said audio output mute flag being set wherein said apparatus sets said audio output mute flag on a substantially real time basis without separating said video signal and said digitized audio signal of said audio visual information signal being reproduced.

5. An audio visual information signal reproducing apparatus for reproducing an audio visual information signal from a recording medium, said audio visual information signal being recorded on said recording medium and composed of a video signal and a digitized audio signal being time-division multiplexed in such a way that the frame interval of said video signal does not accord with the frame interval of said digitized audio signal, comprising:

means for detecting said digitized audio signal in said audio visual information signal;

means for separating said digitized audio signal and said video signal from said audio visual information signal being reproduced;

means for converting said separated digitized audio signal into a tri-state audio data signal by a frequency conversion;

means for detecting a skew sync signal from the state of said tri-state audio data signal so as to detect a position of an audio output mute flag of a control code contained in said digitized audio signal;

means for setting said audio output mute flag in said tri-state audio data signal;

means for restoring said frequency-converted tri-state digitized audio data, with the said audio output mute flag set, into a restored digitized audio signal with the original frequency by a frequency conversion;

means for shifting to a next operation mode responsive to said audio output mute flag being set;

means for delaying said video signal separated from said audio visual information signal being reproduced;

means for multiplexing said reconverted digitized audio signal with said delayed video signal to produce a multiplexed audio visual information signal;

means for outputting said multiplexed audio visual information signal; and means for shifting to a next operation mode responsive to said audio output mute flag being set.

6. An audio visual information signal reproducing apparatus for reproducing an audio visual information signal from a recording medium, said audio visual information signal being recorded on said recording medium and composed of a video signal and a digitized audio signal being time-division multiplexed in such a way that the frame interval of said video signal does not accord with the frame interval of said digitized audio signal, comprising:

means for separating said digitized audio signal and said video signal from said audio visual information signal being reproduced;

means for converting said separated digitized audio signal into a tri-state audio data signal by a frequency conversion;

means for converting said tri-state audio data signal into a bi-state audio data signal;

means for detecting a skew sync signal from said bi-state audio signal;

means for detecting the position of an audio output mute flag according to said frame sync signal being detected;

means for setting said audio output mute flag in said bi-state audio data signal;

means for converting said bi-state audio signal, with said audio output mute flag set, into a tri-state audio data signal;

means for restoring said converted tri-state digitized audio data signal into a restored digitized audio signal with the original frequency by a frequency conversion;

means for delaying said video signal separated from said audio visual information signal being reproduced;

means for multiplexing said restored digitized audio signal with said delayed video signal to produce a multiplexed audio visual information signal;

means for outputting said multiplexed audio visual information signal; and means for shifting to a next operation mode responsive to said audio output mute flag being set.

7. An audio visual information signal reproducing apparatus for reproducing an audio visual information signal from a recording medium, said audio visual information signal being recorded on said recording medium and composed of a video signal and a digitized audio signal being time-division multiplexed in such a way that the frame interval of said video signal does not accord with the frame interval of said digitized audio signal, comprising:

means for separating said digitized audio signal and said video signal from said audio visual information signal being reproduced;

means for converting said separated digitized audio signal into a tri-state audio data signal by a frequency conversion;

means for converting said tri-state audio data signal into a bi-state data signal;

means for de-interleaving said bi-state audio data signal;

means for detecting a frame sync signal in said de-interleaved bi-state audio data signal;

means for detecting the position of said audio output mute flag according to said frame sync signal being detected;

means for setting said audio output mute flag in said de-interleaved bi-state audio data signal;

means for interframe interleaving said bi-state audio data signal with said audio output mute flag set;

means for converting said bi-state data signal into a tri-state audio data signal;

means for restoring said converted tri-state digitized audio data signal into a restored digitized audio signal with the original frequency by a frequency conversion;

means for delaying said video signal separated from said audio visual information signal being reproduced;

means for multiplexing said restored digitized audio signal with said delayed video signal to produce a multiplexed audio visual information signal;

means for outputting said multiplexed audio visual information signal; and means for shifting to a next operation mode responsive to said audio output mute flag being set.

* * * * *